(12) United States Patent
Chiu et al.

(10) Patent No.: US 11,973,985 B2
(45) Date of Patent: Apr. 30, 2024

(54) VIDEO ENCODER WITH MOTION COMPENSATED TEMPORAL FILTERING

(71) Applicant: MediaTek Inc., Hsinchu (TW)

(72) Inventors: Chih-Yao Chiu, Hsinchu (TW);
Chun-Chia Chen, Hsinchu (TW);
Chih-Wei Hsu, Hsinchu (TW);
Tzu-Der Chuang, Hsinchu (TW);
Ching-Yeh Chen, Hsinchu (TW);
Yu-Wen Huang, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 17/892,933

(22) Filed: Aug. 22, 2022

(65) Prior Publication Data

US 2023/0164358 A1 May 25, 2023

Related U.S. Application Data

(60) Provisional application No. 63/282,210, filed on Nov. 23, 2021.

(51) Int. Cl.
| | |
|---|---|
| *H04N 11/02* | (2006.01) |
| *H04N 19/105* | (2014.01) |
| *H04N 19/109* | (2014.01) |
| *H04N 19/117* | (2014.01) |
| *H04N 19/119* | (2014.01) |
| *H04N 19/137* | (2014.01) |
| *H04N 19/167* | (2014.01) |
| *H04N 19/172* | (2014.01) |
| *H04N 19/176* | (2014.01) |

(Continued)

(52) U.S. Cl.
CPC ......... *H04N 19/615* (2014.11); *H04N 19/105* (2014.11); *H04N 19/109* (2014.11); *H04N 19/117* (2014.11); *H04N 19/119* (2014.11); *H04N 19/137* (2014.11); *H04N 19/167* (2014.11); *H04N 19/172* (2014.11); *H04N 19/176* (2014.11); *H04N 19/177* (2014.11); *H04N 19/182* (2014.11)

(58) Field of Classification Search
CPC .................................................. H04N 19/615
USPC ....................................... 375/240.01–240.29
See application file for complete search history.

(56) References Cited

U.S. PATENT DOCUMENTS

| 8,160,132 B2 * | 4/2012 | Holcomb | ............... H04N 19/86 |
| | | | 375/240.26 |
| 8,750,390 B2 * | 6/2014 | Sun | ...................... H04N 19/184 |
| | | | 375/240.29 |

(Continued)

*Primary Examiner* — Leron Beck
(74) *Attorney, Agent, or Firm* — Han IP PLLC; Andy M. Han

(57) ABSTRACT

Various schemes pertaining to pre-encoding processing of a video stream with motion compensated temporal filtering (MCTF) are described. An apparatus determines a filtering interval for a received raw video stream having pictures in a temporal sequence. The apparatus selects from the pictures a plurality of target pictures based on the filtering interval, as well as a group of reference pictures for each target picture to perform pixel-based MCTF, which generates a corresponding filtered picture for each target picture. The apparatus subsequently transmits the filtered pictures as well as non-target pictures to an encoder for encoding the video stream. Subpictures of natural images and screen content images are separately processed by the apparatus.

6 Claims, 16 Drawing Sheets

(51) Int. Cl.
*H04N 19/177* (2014.01)
*H04N 19/182* (2014.01)
*H04N 19/615* (2014.01)

(56) References Cited

U.S. PATENT DOCUMENTS

| | | | | |
|---|---|---|---|---|
| 2003/0202597 | A1* | 10/2003 | Turaga | H04N 19/51 |
| | | | | 375/E7.262 |
| 2006/0146138 | A1* | 7/2006 | Xin | H04N 19/176 |
| | | | | 375/E7.176 |
| 2007/0019730 | A1* | 1/2007 | Lee | H04N 19/61 |
| | | | | 375/E7.125 |
| 2007/0064816 | A1* | 3/2007 | Chiang | H04N 19/61 |
| | | | | 375/E7.181 |
| 2015/0078441 | A1* | 3/2015 | Han | H04N 19/12 |
| | | | | 375/240.18 |
| 2015/0163485 | A1* | 6/2015 | Lin | H04N 19/105 |
| | | | | 375/240.16 |
| 2016/0029028 | A1* | 1/2016 | Pu | H04N 19/463 |
| | | | | 375/240.24 |
| 2018/0124422 | A1* | 5/2018 | Van Leuven | H04N 19/513 |
| 2018/0343448 | A1* | 11/2018 | Possos | H04N 19/176 |
| 2019/0082176 | A1* | 3/2019 | Zhang | H04N 19/176 |
| 2019/0082178 | A1* | 3/2019 | Kim | H04N 19/119 |
| 2019/0098301 | A1* | 3/2019 | Lee | H04N 19/114 |

* cited by examiner

VIDEO ENCODER WITH MOTION COMPENSATED TEMPORAL FILTERING

CROSS REFERENCE TO RELATED PATENT APPLICATION

The present disclosure is part of a non-provisional patent application claiming the priority benefit of U.S. Provisional Patent Application No. 63/282,210, filed on 23 Nov. 2021, the content of which is incorporated by reference in its entirety.

TECHNICAL FIELD

The present disclosure is generally related to video coding and, more particularly, to methods and apparatus for encoding video containing frames that employ motion compensated temporal filtering.

BACKGROUND

Unless otherwise indicated herein, approaches described in this section are not prior art to the claims listed below and are not admitted as prior art by inclusion in this section.

Video coding generally involves encoding a video (i.e., an original video) into a bitstream by an encoder, transmitting the bitstream to a decoder, and decoding the video from the bitstream by the decoder parsing and processing the bitstream to produce a reconstructed video. The encoder may employ various coding modes or tools in encoding the video, with a purpose, among others, of reducing a total size of the bitstream that needs to be transmitted to the decoder while still providing the decoder enough information about the original video such that a reconstructed video that is satisfactorily faithful to the original video can be generated by the decoder. The bitstream may thus include, in addition to data of the video itself, some information of the coding tools employed, which is needed by the decoder to successfully reconstruct the video from the bitstream.

In addition to encoding the original video to reduce the bitstream size, the encoder may also pre-process the video before the actual encoding operations take place. That is, the encoder may examine the picture frames of the original video to comprehend certain features of the video, and then manipulate or otherwise adjust some aspects of the picture frames based on the result of the examination, prior to performing the encoding operations on the picture frames. The pre-process may provide benefits such as further reducing the bitstream size achieved at the output of the encoder end, and/or enhancing certain features of the resulted reconstructed video at the decoder end.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to pre-encoding processing of video picture frames in a video stream with pixel-based filtering, such as motion compensated temporal filtering. It is believed that with the various embodiments in the present disclosure, benefits including improved pre-encoding latency, higher coding gain, and/or reduced hardware overhead are achieved.

In one aspect, a method is presented for processing a video stream having a plurality of source pictures in a temporal sequence, whereas each source picture has a temporal identifier that identifies a temporal location of the respective source picture in the temporal sequence. The method may involve determining a filtering interval. The method may also involve determining a plurality of target pictures based on the filtering interval, wherein the target pictures include a first subset of the plurality of source pictures. The method may also involve determining one or more reference pictures for each target picture. Each reference picture is a source picture of a second subset of the plurality of source pictures, wherein the second subset of the plurality of source pictures comprises the source pictures that are not in the first subset. The method may also involve generating a plurality of filtered pictures, where each filtered picture corresponds to a respective target picture. Each filtered picture is generated by performing pixel-based filtering based on the reference picture(s) corresponding to the respective target picture. The method may further involves encoding the video stream into a bitstream using the filtered pictures generated above as well as the second subset of the plurality of source pictures.

In another aspect, an apparatus is presented which comprises a processor, a target picture buffer, a reference picture buffer, a motion compensation module, and a video decoder. The processor is configured to receive a video comprising a plurality of source pictures in a temporal sequence, wherein each of the plurality of source pictures has a temporal identifier that identifies a temporal location of the respective source picture in the temporal sequence. The target picture buffer is configured to store a plurality of target pictures, which are determined by the processor based on a filtering interval. Moreover, the plurality of target pictures comprising a first subset of the plurality of source pictures. The reference picture buffer is configured to store, for each of the plurality of target pictures, one or more reference pictures that are determined by the processor. Each of the one or more reference pictures is a source picture of a second subset of the plurality of source pictures, wherein the second subset of the plurality of source pictures comprises the plurality of source pictures that are not in the first subset. The motion compensation (MC) module is configured to generate a plurality of filtered pictures, wherein each of the plurality of filtered pictures is generated by the MC module by performing pixel-based filtering to a respective one of the plurality of target pictures. The MC module performs the pixel-based filtering based on the one or more reference pictures corresponding to the respective target picture. The video encoder is configured to encode the plurality of filtered pictures and the second subset of the plurality of source pictures into a bitstream that represents the video.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Implementations in accordance with the present disclosure relate to various techniques, methods, schemes and/or solutions pertaining to encoding a video with motion compensated temporal filtering (MCTF) pre-encoding processing. According to the present disclosure, a number of possible solutions may be implemented separately or jointly. That is, although these possible solutions may be described below separately, two or more of these possible solutions may be implemented in one combination or another.

I. Pre-Encoding Processing Using MCTF

Figure 1:
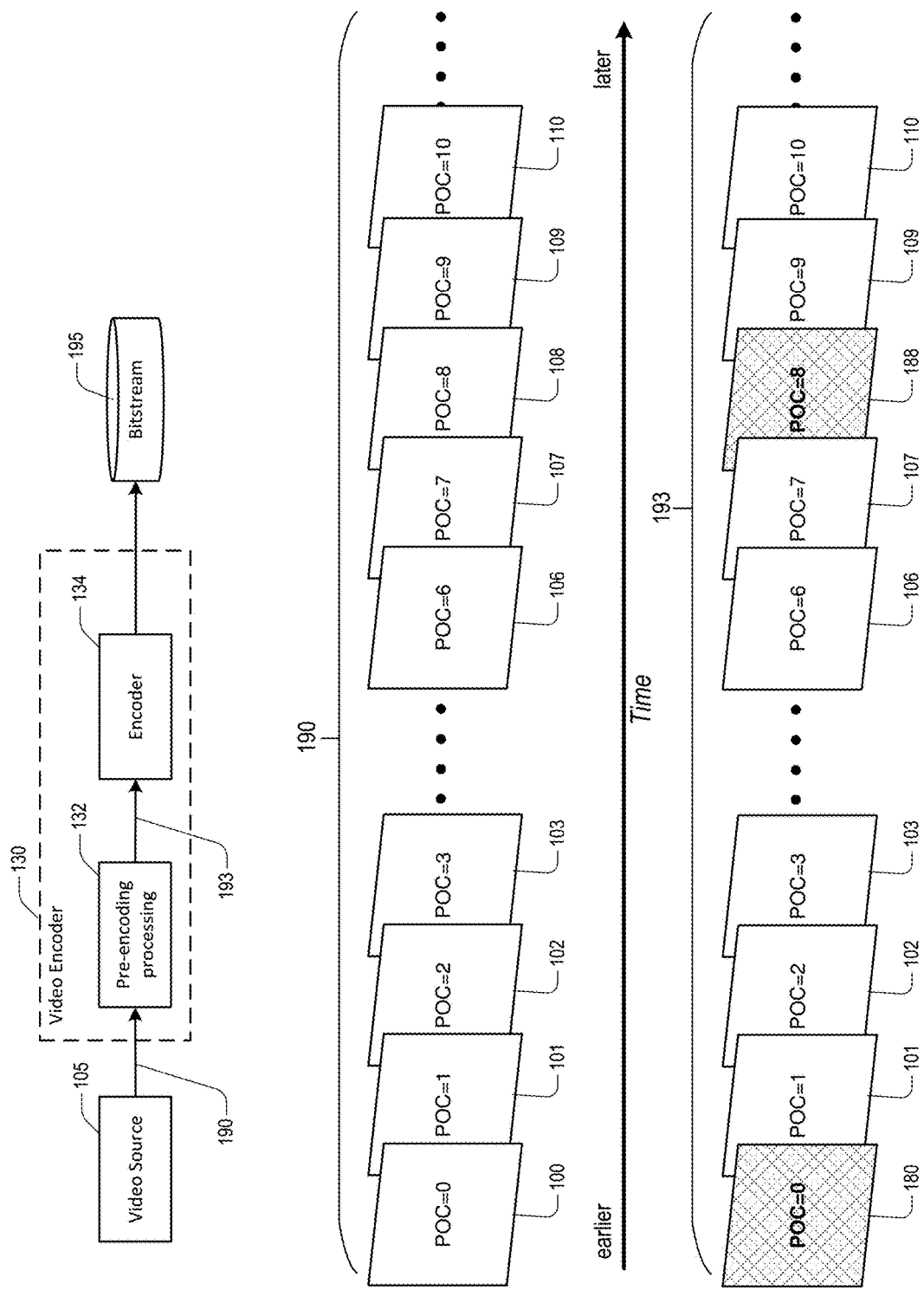
FIG. 1 is a diagram of an example design in accordance with an implementation of the present disclosure.

As described above, instead of directly encoding the picture frames of a source video, an encoder may process the source video frames before actually encoding the video. FIG. 1 is a diagram of an example design in accordance with an implementation of the present disclosure, wherein a video encoder 130 is shown as having a pre-encoding module 132, as well as an encoding module 134 (a video encoder in traditional sense). The video encoder 130 is configured to receive a video stream comprising a temporal sequence 190 of a plurality of source video frames from a video source 105. The pre-encoding process module 132 is configured to change or adjust certain features of the source video frames of the temporal sequence 190 by performing a pre-encoding process to enable the encoding module 134 to perform a more efficient encoding process that may result in a more superior encoding outcome, for example, a smaller encoded video size of a bitstream 195 and/or higher subjective/objective video quality of a video that is to be decoded by a video decoder accessing the bitstream 195.

In general, a video is made of multiple pictures, or "frames", that are presented in a temporal sequence. That is, a series of pictures, when captured or displayed in a certain sequential order in time, is referred to as a video. For example, a video camera, or a camcorder, may capture a video of an object in motion over a period of time using a series of picture frames, with each picture frame containing a "snapshot" of the object at a different moment, i.e., a recording of the object at a specific moment during the period of time. When displayed in the same temporal order with which the camera records the object, the video is then a faithful reproduction of the object in motion during the period of time.

A video may be generated by means other than a camera. For example, a video game or a cartoon animation may include a series of pictures generated by a computer graphic algorithm or from human drawings. In some embodiments, multiple sources may be combined to generate a video. Regardless of the originator or the method by which it is generated, a video includes multiple pictures having a temporal relationship between them. Namely, a video has multiple pictures presented or recorded in a temporal sequence. To present the pictures as the video, (e.g., on a display), the temporal relationship between the pictures must be maintained. That is, the order of the pictures, i.e., the temporal location of each of the pictures in the temporal sequence, is to be recorded or otherwise specified.

As illustrated in FIG. 1, the pre-encoding processing module 132 performs certain operations to the temporal sequence 190, thereby modifying the temporal sequence 190 into another temporal sequence 193, which is passed to the encoding module 134. Parts of the temporal sequence 190 remains unchanged in the temporal sequence 193, while other parts thereof are changed by the pre-encoding processing module 132, as described in detail herein below.

FIG. 1 also illustrates a temporal sequence recording scheme employed by the temporal sequences 190 and 193, wherein a temporal relationship between pictures can be recorded. As shown in FIG. 1, the temporal sequence 190 includes a series of pictures, such as a picture 100, a picture 101, a picture 102, a picture 103, . . . , a picture 106, a picture 107, a picture 108, a picture 109 and a picture 110, that are presented in a temporal sequence 190, wherein a temporal relationship exists among the pictures. The temporal relationship is manifested in the sequential order of the pictures in the temporal sequence 190. For example, the picture 100 is the first picture of temporal sequence 190. That is, the picture 100 represents the first frame as the temporal sequence 190 is presented (e.g., recorded or displayed) as a video. The picture 101 is followed by the picture 102 in time, which is followed by the picture 103, etc., in the temporal sequence 190. Similarly, the picture 106 is followed by the picture 107, which is followed by the picture 108, which is followed by the picture 109, which is followed by the picture 110, and so on. Moreover, each of the pictures of the video of FIG. 1 has a temporal identifier, called "picture order count (POC)", which is an integer used to record or otherwise identify a temporal location of the respective picture in the temporal sequence 190. As shown in FIG. 1, the picture 100 has the respective temporal identifier specified or otherwise recorded as POC=0, whereas the POC of the picture 101 is specified as POC=1. Similarly, the POC values of the pictures 102, 103, 106, 107, 108, 109 and 110 are specified as POC=2, 3, 6, 7, 8, 9, and 10, respectively, as shown in FIG. 1. Using this scheme, the temporal relationship among the pictures is recorded. The POC value of a particular picture identifies the temporal location of the picture in the temporal sequence of the video. Each picture in the temporal sequence has a unique POC value, and a first picture having a POC value smaller than that of a second picture must precede the second picture in the temporal sequence of the video. The POC information is important for an encoder to perform the pre-encoding process, as will be disclosed in detail elsewhere herein below.

The general idea of pre-encoding processing according to the present disclosure is as follows. In the present disclosure, the terms "frame", "picture frame" and "source picture" are interchangeably used to refer to a picture in a video prior to the pre-encoding process is being performed, but not limited to pictures recorded or otherwise generated by a camera. As shown in FIG. 1, the video received by the video encoder 130 from the video source 105 includes the source pictures 100, 101, . . . , 109, 110, etc., in the temporal sequence 190. Some pictures among those source pictures (e.g., the source pictures 100 and 108) are chosen as "target pictures", upon which the pre-encoding processing module 132 is to perform certain pre-encoding processing operations. The rest of the source pictures in the temporal sequence 190, i.e., those not chosen to be the target pictures, are called "reference pictures" (e.g., the source pictures 101, 102, . . . , 107 and 109, 110, etc.). Specifically, the pre-encoding processing unit 132 will generate, for each of the target pictures, a "processed picture", or sometimes called "filtered pictures", such as the pictures 180 and 188. One or more of the reference pictures may be employed or otherwise referred to by the pre-encoding process for generating the processed picture. Different subsets of the reference pictures may be used by the pre-encoding process to generate the processed pictures for different target pictures. The pre-encoding process performed by the pre-encoding processing unit 132 will change or otherwise modify the temporal sequence 190 into the temporal sequence 193, which includes the filtered pictures 180 and 188, as well as the reference pictures 101, 102, . . . , 107 and 109, 110. It is worth noting that the temporal relationship of the pictures in the temporal sequence 190 is inherited or otherwise maintained in the temporal sequence 193. That is, the processed pictures 180 and 188 maintain the same POC values as the targeted pictures 100 and 108, respectively.

The pre-encoding processing according to the present disclosure involves applying motion compensated temporal filtering (MCTF) to certain reference picture(s) to generate the processed pictures for the target pictures. Therefore, in the present disclosure, the terms "processed picture" and "filtered picture" are interchangeably used. The main concept of MCTF is to generate a filtered picture for a target picture by performing discrete wavelet transformation with motion compensation (MC) over a group of reference pictures that are associated or otherwise related with the target picture. Typically, the reference pictures used or otherwise referenced by MCTF are neighboring frames of the target picture. For example, if the picture 108 is a target picture, then the corresponding group of reference pictures to be used by MCTF may include the pictures 106, 107, 109 and 110. In an alternative embodiment, the corresponding reference pictures for the target picture 108 may include the pictures 107 and 109, or the pictures 106 and 107, or the pictures 109 and 119. In some embodiments, MCTF may reference to only one reference picture, namely, either the picture 107 or the picture 109, to generate the filtered picture for the target picture 108.

After the corresponding reference pictures are selected or otherwise determined for a target picture, MCTF involves finding a resemblance of the target picture in each of the reference pictures. This may be performed using block-based motion estimation (ME) and motion compensation (MC) techniques commonly employed in interframe coding, especially the ones using block-matching algorithms.

Specifically, the target picture may be divided into a plurality of non-overlapping prediction blocks, each being a rectangular region of the target picture. For each prediction block of the target picture, a best-matching block of the same size is to be found in each of the reference pictures. The best-matching block may be found using an integer pixel search algorithm within a certain search range of the reference picture. As indicated by the word "search", the encoder will examine all candidate blocks within that search range, and then find the candidate block that has the least amount of difference (e.g., lowest distortion) among the candidate blocks as compared to the prediction block of the target picture. For reference pictures neighboring the target picture, the candidate blocks are often a displaced version of the prediction block. Each of the candidate blocks of the reference picture is of the same size (i.e., width and height) as the prediction block. For integer pixel search, the candidate blocks differ from each other by one pixel in either horizontal direction or vertical direction.

To find the best-matching block, the encoder calculates difference between each candidate block and the prediction block. A loss value may be used to represent the difference between each candidate block and the prediction block, with a smaller loss value indicating a closer resemblance. In some embodiments, the loss value may be calculated using error matrices such as sum of squared differences (SSD) or sum of absolute differences (SAD) across all block pixels of a particular candidate block. The candidate block having the smallest loss value is the one that matches the prediction block best, and thus the best-matching block. Accordingly, the integer pixel search algorithm determines, for each prediction block, a respective MC result from each of the reference pictures, wherein the MC result includes the best-matching block itself and the loss value associated with the best matching block.

Figure 2:
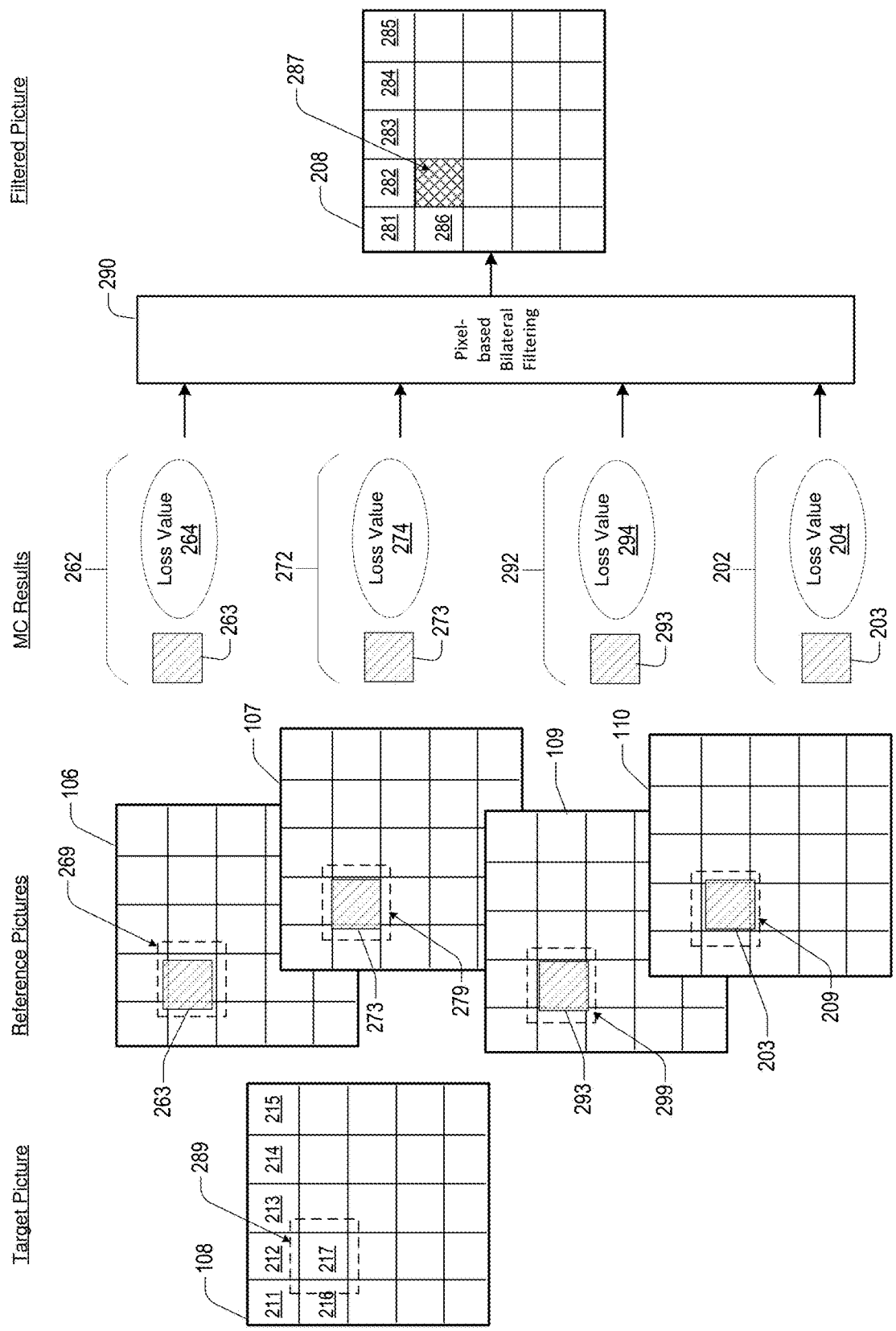
FIG. 2 is a diagram of an example design in accordance with an implementation of the present disclosure.

Take the target picture 108 for example. FIG. 2 illustrates how integer pixel search may be performed for the target picture 108 of FIG. 1. As shown in FIG. 2, the target picture 108 is divided into a plurality of prediction blocks, such as prediction blocks 211, 212, 213, 214, 215, 216 and 217. Moreover, a group of reference pictures, i.e., the source pictures 106, 107, 109 and 110, has been determined to be referenced for generating a filtered picture 208 for the target picture 108. That is, the source pictures 106, 107, 109 and 110 are the reference pictures corresponding to the target picture 108. The filtered picture 208 may be an embodiment of the filtered picture 188. For each of the prediction blocks of the target picture 108, the encoder is to find one corresponding block from each of the reference pictures. The corresponding block would be a block that closely resembles the prediction block. In fact, the corresponding block would be a block on the corresponding picture that, within a specific search range thereon, best matches the prediction block.

For instance, during the pre-encoding process, the encoder would search for a respective one best-matching block that matches the prediction block 217 on each of the reference pictures 106, 107, 109 and 110. Specifically, to find the respective best-matching blocks, the encoder will search a rectangular region on each of the reference pictures 106, 107, 109 and 110, wherein the rectangular region corresponds to the prediction block 217 and its surrounding area. The rectangular region, referred as "search range", is the same for each of the reference pictures 106, 107, 109 and 110. As shown in FIG. 2, a search range 269 on the reference picture 106 is searched for finding a block on the reference picture 106 that best matches the prediction block 217 of the target block 108. Similarly, a search range 279 on the reference picture 107, a search range 299 on the reference picture 10, and a search range 209 on the reference picture 110 are searched, respectively, to find best-matching blocks on the reference pictures 107, 109 and 110, respectively. Accordingly, best-matching blocks 263, 273, 293 and 203 are respectively determined by the integer pixel search algorithm for reference pictures 106, 107, 109 and 110, respectively. As shown in FIG. 2, each of the best-matching blocks 263, 273, 293 and 203 is within the respective search range, even though its location in the respective reference picture may not be the same as the exact location the prediction block 217 in the target picture 108.

Typically, the search range would be larger than the size of the prediction block. Assuming that the prediction block 217 has a size of 32×32 (i.e., 32 pixels in width and 32 pixels in height), then each of the search ranges 269, 279, 299 and 209 may have a size of (32+delta) pixels by (32+delta) pixels, such as 43×43 or 50×50.

In the pre-encoding process, a motion compensation step follows the integer pixel search step, wherein the results of integer pixel search, which include the best-matching blocks 263, 273, 293 and 203, are stored or otherwise buffered for a filtering step that follows the motion compensation step. For example, the motion compensation step stores an MC result 262 that is output by the integer pixel search algorithm as the algorithm has determined the best-matching block 263. The MC result 262 includes the best-matching block 263 itself (i.e., the pixel values thereof), as well as a loss value 264, which is used to quantify or otherwise represent the difference between the prediction block 217 and the best-matching block 263. Various matrices may be used to calculate the loss value 264, such as SSD, SAD, etc., as mentioned above. Likewise, the motion compensation step also stores MC results 272, 292 and 202, which are output by the integer pixel search algorithm as the algorithm determines the best-matching blocks 273, 293 and 203, respectively. As shown in FIG. 2, the MC result 272 includes the best-matching blocks 273, as well as a loss value 274, which quantifies the difference between the prediction block 217 and the best-matching block 273. Likewise, the MC result 292 includes the best-matching blocks 293 and a loss value 294 that quantifies the difference between the prediction block 217 and the best-matching block 293, while the MC result 202 includes the best-matching blocks 203 and a loss value 204 that quantifies the difference between the prediction block 217 and the best-matching block 203. All the loss values, i.e., loss values 264, 274, 294 and 204, are calculated using a same loss calculation matrix so they can be compared with each other meaningfully.

The filtering step that follows the motion compensation step takes the MC results 262, 272, 292 and 202 as the input of the step and accordingly generates a filtered block 287 of the filtered picture 208. The filtering step may employ pixel-based bilateral filtering, wherein each pixel of the filtered block 287 may be calculated according to a weighted sum equation as shown below:

$$F_n = \frac{\sum_{i=0}^{k-1}(w_i \times B_{i,n})}{\sum_{i=0}^{k-1} w_i},$$

wherein $F_n$ denotes the value of the n-th pixel of the filtered block 287, k denotes the total number of the reference pictures (i.e., reference pictures 106, 107, 109 and 110) corresponding to the target picture 108, $B_{i,n}$ denotes the value of the n-th pixel of the best-matching block found in the i-th reference picture, and $w_i$, a real number, denotes a weight for the pixel value when $B_{i,n}$ is from the i-th reference picture. A weight is a real number. In some embodiments, the weights $w_i$'s are determined using the loss values (i.e., loss values 264, 274, 294 and 204), and not all the weights $w_i$'s may have a same value.

As shown in FIG. 2, the filtered picture 208 comprises a plurality of filtered blocks, such as filtered block 287, as well as filtered blocks 281, 282, 283, 284, 285 and 286. Each of the filtered blocks is generated in a similar way as how the filtered block 287 is generated as described above, thereby the filtered picture 208 corresponding to the target picture 108 is generated.

In some embodiments, the temporal sequence 190 may include multiple target pictures, namely, target pictures other than the picture 108. For each of the target pictures, a corresponding group of reference pictures may be determined, which are subsequently used by the encoder to generate a filtered picture corresponding to the respective target picture, in a way similar to how the filtered picture 208 is generated for the target picture 108.

In some embodiments, the encoder may determine a filtering interval, and the target pictures may be selected based on the filtering interval. Specifically, the filtering interval determines how often or how frequently a filtered picture is to be generated in a temporal sequence having a plurality of source pictures. For example, the encoder may determine a filtering interval of eight frames for the temporal sequence 190. Accordingly, the pre-encoding process would choose the target pictures using an eight-frame increment. For instance, for the temporal sequence 190, the source picture 100 may be selected as a target picture in addition to the source picture 108. The POC number may be used along with the filtering interval in selecting the target pictures, and every source picture of which the POC value is a multiple of the filtering interval is selected as a target picture to which MCTF is applied. For example, a filtering interval of 8 frames may result in source pictures having POC=0, 8, 16, 24, 32, 40, 48, 56, 64, . . . , etc., to be target pictures. Similarly, a filtering interval of 10 frames may result in source pictures having POC=0, 10, 20, 30, 40, 50, 60, . . . , etc., to be target pictures. Namely, the POC difference between any two consecutive target pictures is equal to the filtering interval. In some embodiments, the encoder may determine the filtering interval using a default or predetermined value, rather than based on any algorithm or any specifics of the temporal sequence. For example, the encoder may use a default filtering interval of 8 frames for any temporal sequence without determining a filtering interval based on any specifics of the temporal sequence 190.

In some embodiments, a hierarchical pixel search approach comprising integer pixel search and fractional pixel search may be employed for the pre-encoding process. That is, one or more additional fractional pixel search steps may follow the integer pixel search step, which enables the encoder to find even better matching blocks as compared to those found using only integer pixel search. The operation of fractional pixel search is similar to that of integer pixel search, except that the candidate blocks differ from each other by a fraction of a pixel in either horizontal direction or vertical direction. Also, the search range may be adaptively adjusted to include the best-matching block resulted from the integer pixel search and its surrounding area. For example, if the encoder is to perform fractional pixel search following finding the best-matching block 263, a search range for the following fractional pixel search may be adjusted to a rectangular region encompassing the best-matching block 263 as well as some surrounding area.

In some embodiments, the size of the prediction block for fractional pixel search may be smaller than that for integer pixel search. For example, each of the prediction blocks of target picture 108 may be further divided as prediction blocks for fractional pixel search. Assume that the size of the prediction block 217 is 32×32; when the encoder performs fractional pixel search, the prediction block 217 may be divided into four smaller blocks each having a size of 16×16, and each of the smaller blocks may individually go through the motion compensation process for finding a best-matching block of 16×16 size in each of the reference pictures 106, 107, 109 and 110. To perform fractional pixel search, the encoder is required to use interpolation techniques to generate fractional pixel values using the pixel values of a reference picture. For example, if a ½-pel (i.e., half pixel) search is to follow the integer pixel search, the encoder is to generate the half pixels in the reference pictures by using the integer pixel values of the reference pictures with interpolation. Accordingly, the candidate blocks differ from each other by ½-pel in either horizontal direction or vertical direction. Furthermore, if a ¼-pel (i.e., quarter pixel) search is to subsequently follow the ½-pel search, the encoder is to generate the quarter pixels in the reference pictures by using the integer pixel values and the of the ½-pel values of the reference pictures with interpolation, wherein the candidate blocks differ from each other by ¼-pel in either horizontal direction or vertical direction.

After completing the pre-encoding processing, the encoder proceeds to encode the video into a bitstream. Instead of directly encoding the original source pictures of the source video, the encoder encodes the reference pictures and the filtered pictures into the bitstream, leaving the target pictures out of the bitstream. Namely, the filtered pictures replace the target pictures in the encoding process. For example, the filtered picture 208 would replace the source picture 108 when the encoder encodes the temporal sequence 190 into a bitstream. The filtered pictures would the resume or otherwise inherit the POC values of their corresponding target pictures so that the filtered pictures replace the target pictures in their respective temporal locations in the video. For example, the filtered picture 208 would thus have POC=8, the same POC value as its corresponding target picture, the source picture 108.

As mentioned above, the replacing of the target pictures by the corresponding filtered pictures generated from the pre-encoding process helps to achieve a more efficient video encoding, which is usually manifested as a smaller bitstream size and/or higher subjective/objective video quality. In some embodiments in accordance with the MCTF pre-encoding process as described above, a coding gain as much as 6% may be resulted for a video of 4K resolution.

II. Subpicture-Based Pre-Encoding Processing

In some embodiments in accordance with the present disclosure, an even higher coding gain and/or a shorter processing time may be achieved for a video containing hybrid source pictures. A hybrid picture includes an area of a natural image (NI) as well as an area of a screen content image (SCI). In general, a natural image is an image containing objects that exist in the real world, whereas a screen content image contains computer-generated objects or text such as screen shots, webpages, video game images and other computer graphics.

Various video use cases nowadays have hybrid pictures in the video, where NI content and SCI content are presented in a same picture. For example, during a television sports event broadcast, the television screen may show a sports field, players playing the sport, audience cheering, clouds moving in the sky, etc., which is NI content of the screen. Additionally, there may be SCI content such as player statistics, scoreboards, advertisement messages, live text comments from television viewers, etc., simultaneously presented on the same screen along with the NI content.

It is not the most efficient way of performing pre-encoding processing as described above if MCTF is applied indistinctly to both the NI content and SCI content in a frame. Our experimental data shows that, while MCTF is able to facilitate a decent and satisfactory coding gain for NI content, the coding gain achieved from MCTF-filtered SCI content is quite insignificant. Therefore, a more efficient pre-encoding process is realized when MCTF uses more reference pictures for the NI content and fewer reference pictures for the SCI content. In some embodiments, MCTF may use reference pictures for the NI content only, but not for the SCI content. Namely, MCTF is applied to only the NI portion of a target picture but not the SCI portion thereof, thereby saving processing time, power consumption, and hardware overhead that would have been used for performing MCTF on the SCI content, which would have resulted in just very little coding gain.

In some embodiments, the savings (e.g., in processing time and/or hardware overhead) from not applying MCTF to the SCI content may be spent on the NI content to improve the resulted encoded video. For example, more frames can be included as reference pictures when applying MCTF to the NI content of the video. In general, the more reference frames used, the better matching blocks can be found, and thus a higher coding gain may be resulted. Alternatively or additionally, the search range for integer or fractional pixel search (e.g., the search ranges 269, 279, 299 and 209) can be made larger, which also increases the chance of finding better matching blocks.

In a hybrid picture, NI content and SCI content are usually presented in separate subpictures of the hybrid picture. A subpicture is a partial region of a picture. A subpicture can be one or more tiles and/or slices of a picture. During video coding, a picture is typically partitioned into coding tree blocks (CTBs), each CTB being a rectangular region of the picture that serves as a basic unit of encoding or decoding the picture. Slices are fragments of a picture that is formed by correlative (in a raster scan order) CTBs, whereas tiles are rectangular divisions of a picture comprising multiple neighboring CTBs. Each tile or slice can be independently encoded, decoded, or otherwise processed. A hybrid picture may include one or more NI subpictures and one of more SCI subpictures.

Figure 3:
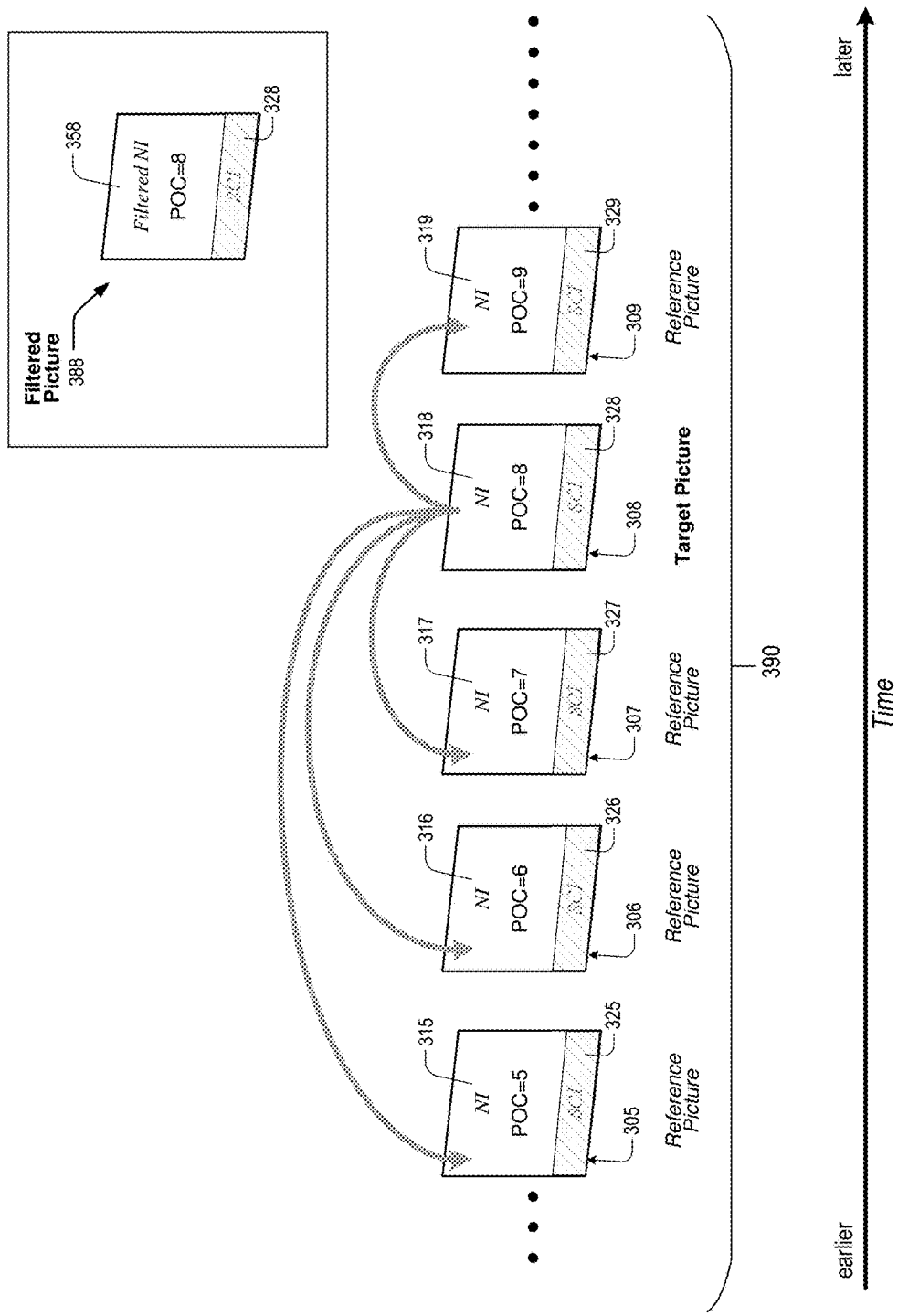
FIG. 3 is a diagram of an example design in accordance with an implementation of the present disclosure.

FIG. 3 is a diagram of an example design in accordance with an implementation of the present disclosure. Specifically, FIG. 3 illustrates a video having a temporal sequence 390, which includes a plurality of hybrid pictures, such as source pictures 305, 306, 307, 308 and 309. For pre-encoding processing, the encoder determines that the source picture 308 is a target picture. The encoder further determines that the target picture 308 references to the source pictures 305, 306, 307 and 309 for MCTF. That is, the source pictures 305, 306, 307 and 309 are the group of reference pictures referenced for generating a MCTF filtered picture for the target picture 308 as described above with FIG. 2. As shown in FIG. 3, each of the source pictures 305, 306, 307, 308 and 309 includes a first subpicture having NI content and a second subpicture having SCI content. For example, the source picture 305 has a NI subpicture 315 and a SCI subpicture 325. Similarly, the source picture 306 has a NI subpicture 316 and a SCI subpicture 326; the source picture 307 has a NI subpicture 317 and a SCI subpicture 327; the source picture 308 has a NI subpicture 318 and a SCI subpicture 328; the source picture 309 has a NI subpicture 319 and a SCI subpicture 329. Also shown in FIG. 3 is a filtered picture 388 corresponding to the target picture 308. The encoder generates the filtered picture 388 by only referencing to the NI subpictures of the reference pictures 306, 307, 308 and 309 (i.e., the subpictures 315, 316, 317 and 319), without referencing to any of the SCI subpictures thereof (i.e., the subpictures 325, 326, 327 and 329). Specifically, when applying MCTF using a process as described above with FIG. 2, only prediction blocks from the NI subpictures 315, 316, 317 and 319 are going through the motion compensation step and the bilateral filtering step. That is, the MC results taken by the bilateral filtering step as input are only from motion compensation performed on those prediction blocks of the NI subpictures 315, 316, 317 and 319. Accordingly, the filtered picture 388 includes a filtered NI subpicture 358, which is resulted from MCTF using reference subpictures 315, 316, 317 and 319, as well as the unfiltered SCI subpicture 328. That is, the SCI content of the filtered picture 388 is a direct copy of the SCI content of the original target picture 308.

In the example design shown in FIG. 3, each picture has one NI subpicture and one SCI subpicture, but embodiments in accordance with the present disclosure is not limited to that. Namely, a target picture may have multiple NI subpictures and/or multiple SCI subpictures, and MCTF is to apply to all of the multiple subpictures but none of the multiple SCI subpictures. Since MCTF pre-encoding processing is applied to NI subpictures only instead of full frame, the pre-encoding process becomes more efficient, using less computation power, having less processing latency and/or shorter processing time. Also, the size of hardware (e.g., memory buffer) needed for storing MC results is smaller, as the size of the best-matching blocks are only as large as the NI content instead of the full frame.

In some embodiments in accordance with the present disclosure, the encoder determines the number of reference pictures for a target picture based on the filtering interval. Suppose that the encoder has determined the filtering interval to be N, i.e., every N-th picture in the video stream is chosen to be a target picture. In an event that a target picture contains only NI content, the encoder may determine to reference to several N neighboring frames when applying MCTF to the target picture. However, in an event that a target picture is a hybrid picture containing both NI subpicture(s) and SCI subpicture(s), the encoder may disable MCTF for the SCI subpicture(s) of the target picture while maintaining MCTF for the NI subpicture(s) with N neighboring frames. Alternatively, the encoder may even increase the number of reference pictures for the NI subpicture(s) from N to N+k, where k is a positive integer.

III. Hardware Considerations of MCTF

As described above, the pre-encoding process using MCTF involves operations of block-based pixel search, motion estimation and motion compensation. As described elsewhere herein below, these operations are also essential operations performed in the actual encoding of the video, especially by the inter-picture prediction module thereof. Given that these certain similar functions are performed in both pre-encoding processing and the actual encoding phase, and that pre-encoding processing takes place before the actual encoding happens, it follows that some hardware components inside the inter-picture prediction module may be shared with pre-encoding processing. That is, instead of having separate hardware dedicated for the MCTF pre-encoding process, certain hardware inside the inter-picture prediction module, such as the integer motion estimation (IME) kernel and the fractional motion estimation (FME) kernel, may be used by the MCTF pre-encoding process.

To share IME and FEM that are designed for performing inter-picture prediction of video encoding, certain limitations may need to be imposed on the MCTF pre-encoding process, some of which are presented in this section. In some embodiments, different numbers of reference frames may be determined for different types of target pictures in a video. Typically, a video frame to be encoded into a bitstream belongs to one of the following three frame types: an intra-coding frame (I-frame), a predicted frame (P-frame), and a bi-directional predicted frame (B-frame). An I-frame uses only spatial compression but not temporal information. Namely, an I-frame uses only information within itself, but not information from other frames, for motion estimation and motion compensation. Therefore, I-frames take up the most bits within a video stream. In contrast, a P-frame predicts what has changed from the previous (i.e., past, having smaller POC values) frames, resulting in a combination of spatial and temporal compression. Therefore, P-frames offer much better compression than I-frame. A B-frames is similar to a P-frame in using a combination of both spatial and temporal compression, except that a B-frame goes one step further and references both the past and future (in terms of POC) frames for motion estimation and motion compensation. In consequence, B-frames generally offer the highest compression and take up the fewest bits within a video stream, as compared to P-frames and I-frames.

In some embodiments in accordance with the present disclosure, the encoder determines the number of reference pictures for a target picture based on the filtering interval. Suppose that the encoder has determined the filtering interval to be N, i.e., every N-th picture in the video stream is chosen to be a target picture. Depending on the frame type of each of the target picture, the encoder determines a corresponding number of reference pictures to be used for the MCTF step. In some embodiments, an I-frame target picture has the neighboring N frames as its MCTF reference pictures, whereas a P-frame target picture has the neighboring N/2 frames as its MCTF reference pictures. Moreover, MCTF is disabled for B-frame target pictures. That is, the encoder does not perform pre-encoding processing on B-frames, and therefore no reference pictures are determined for them. For example, if the filtering interval for a video is determined to be every eight pictures (i.e., N=8), then source pictures with POC=0, 8, 16, 24, 32, 40, 48, 56, 64, . . . , etc., are chosen to be the target pictures. Further assume that the POC=32 frame is an I-frame, the POC=16 frame is a P-frame, and the POC=8 and 24 frames are B-frames. Accordingly, the encoder may determine that the POC=32 target picture has eight reference pictures for MCTF, i.e., the neighboring frames having POC=28, 29, 30, 31, 33, 34, 35 and 36. Moreover, the encoder may determine that the POC=16 target picture has four reference pictures for MCTF, i.e., the neighboring frames having POC=14, 15, 17 and 18. The encoder may further determine not to apply MCTF for the POC=8 and 24 target frames, and thus they have zero reference pictures.

Figure 4:
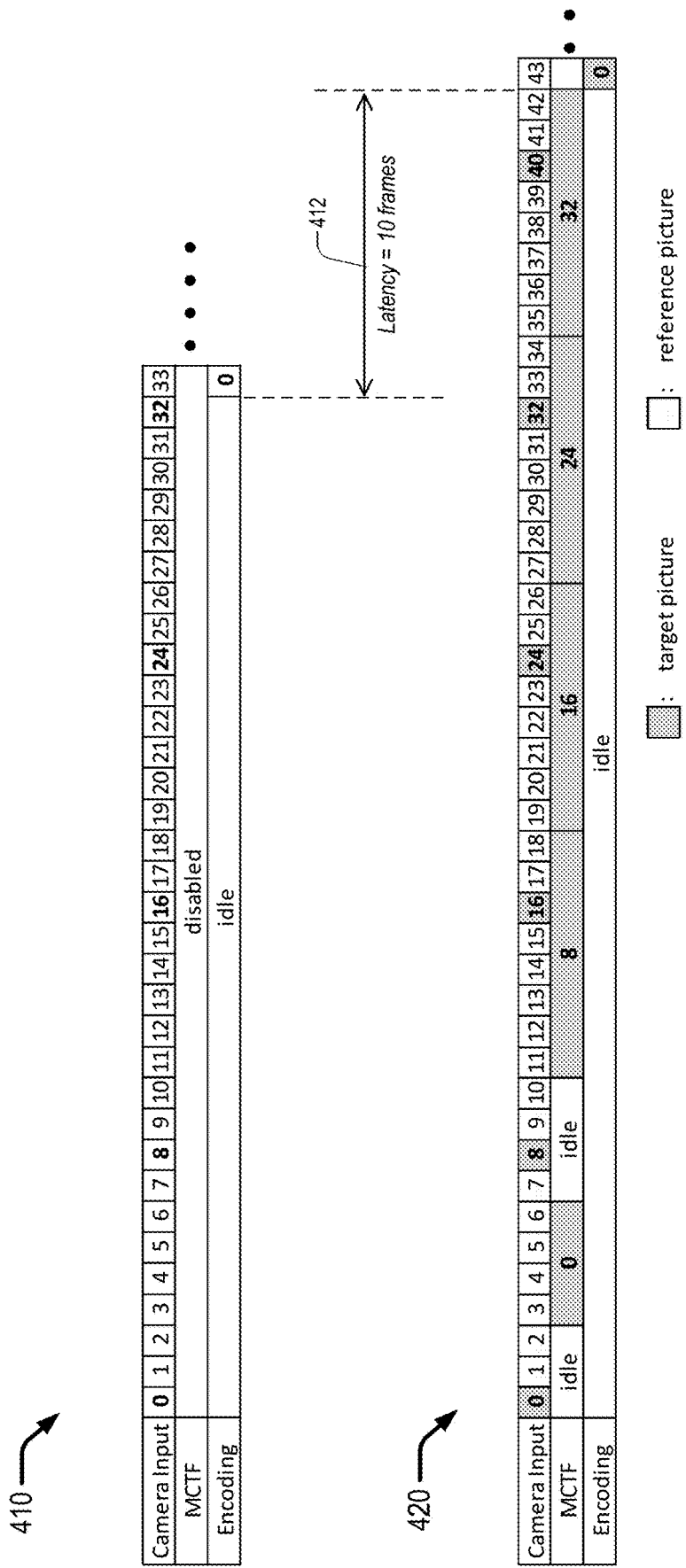
FIG. 4 is a diagram of an example design in accordance with an implementation of the present disclosure.

In some embodiments, the determining of reference pictures for target pictures may be tailored to improve hardware overhead and/or processing latency caused by the MCTF pre-encoding process. FIG. 4 is a diagram of an example design in accordance with an implementation of the present disclosure. In FIG. 4, a diagram 410 illustrates a timing diagram of a video stream with MCTF pre-encoding processing disabled. The first row of the diagram 410 represents the source pictures of a timing sequence as the source pictured are labeled as POC=0, 1, 2, 3, 4, 5, . . . , 32. The second row of the diagram 410 shows that MCTF pre-encoding is disabled. Moreover, the third row of the diagram 410 shows that the encoder is idle and does not start the actual encoding of the picture frames until the POC=32 frame has been received. This is because the video has a group-of-pictures (GOP) size of 32 frames. Namely, frames of POC=0-31 belongs to a same GOP. A GOP is a collection of successive pictures within a coded video stream. The coded video stream consists of successive GOPs of the same size, and each GOP is an independent unit for encoding and decoding, as all the motion estimation and motion compensation of the inter-coded frames only reference to pictures within the GOP, plus the first frame of the following GOP. Therefore, the encoder cannot start encoding the GOP consisting of the POC=0-31 frames until all of the POC=0-32 frames have been in the possession of the encoder. A GOP has one I-frame, which is the first frame of the GOP. Therefore, the GOP size of a video stream is the distance (measured in the number of frames) between two successive I-frames. From decoder's point of view, encountering a new GOP in a coded video stream means that the decoder does not need any previous frames in order to decode the next ones.

A diagram 420 illustrates a timing diagram of the same video stream in the diagram 410, but with MCTF pre-encoding processing enabled. For the MCTF process, the filtering interval is 8 frames. As shown in the diagram 420, picture frames of POC=0, 8, 16, 24, 32, and 40 are marked differently to show that they are the target pictures (i.e., filtering interval=8 frames). Moreover, one or more neighboring frames around each of the picture frames are also marked differently to show the corresponding group of reference pictures the respective target picture is to reference to for MCTF. For example, the target picture POC=0 has two frames, POC=1 and 2, as its reference pictures, whereas each of the rest target pictures of the diagram 420 has four reference pictures. For example, the target picture POC=8 has the frames POC=6, 7, 9 and 10 as its reference pictures, as marked in the diagram 420. The second row of the diagram 420 shows activities of MCTF pre-encoding processing for the video. When the encoder is receiving POC=0-2 frames as camera input, MCTF is idle. After the POC=0-2 frames are received, the encoder is able to start MCTF processing for the target picture POC=0, because that is the earliest time when the reference pictures needed for processing the POC=0 frame, i.e., POC=1 and 2 frames, are in the possession of the encoder. As shown in the diagram 420, the MCTF hardware takes the time of four frames to complete MCTF processing for the POC=0 target picture. That is, while the camera input sends in frames of POC=3-6, the encoder is processing the POC=0 target frame for MCTF, and completes the processing by the time the POC=6 frame is sent in. Subsequently, the MCTF hardware goes idle again during the time the encoder receives frames POC=7-10, because the encoder needs information of POC=6, 7, 9 and 10 frames to process the POC=8 target picture, as they are its reference pictures. It takes eight frames of time to complete MCTF for the POC=8 target picture, which is twice as long as it took for performing MCTF for the POC=0 target picture. This is because the POC=0 target picture has only two reference pictures, whereas the POC=8 target picture has four reference pictures.

Comparing the diagrams 410 and 420 shows that a latency of 10 frames of time is introduced, as explained below. In the diagram 410 where MCTF pre-encoding is disabled, the encoder is able to start the actual video encoding after the POC=32 frame has been received. When MCTF pre-encoding is enabled, however, the encoding has to start much later. Given that POC=32 is a target picture, the actual video encoding cannot not start until the filtered picture corresponding to the POC=32 target picture is generated. As shown in the diagram 420, the MCTF for the POC=32 target picture is being performed when the source pictures of POC=35-42 are being received. Therefore, the earliest time the encoder can start encoding the GOP consisting of the POC=0-31 frames is the next cycle, i.e., when the POC=43 frame is being received. Compared with the diagram 410, a latency 412 of a length of 10 frames is introduced due to the enabling of MCTF pre-encoding processing. The latency due to MCTF translates directly into hardware cost. That is, a memory buffer is thus needed to temporarily store the frames during the latency as they come in so that the buffer can reference to them later when needed. For example, in the scenario depicted in the diagram 420, the encoder needs a memory buffer to temporarily store the source pictures of POC=33-42 when the encoder receives them, as during that period of time the MCTF hardware is being occupied by the pre-encoding processing of the target pictures POC=24 and 32. The memory buffer holds the source pictures of POC=33-42 until MCTF hardware is ready to use them at a later time, for example, when MCTF hardware processes the target pictures POC=32 and 40.

IV. Latency Considerations of MCTF

Figure 5:
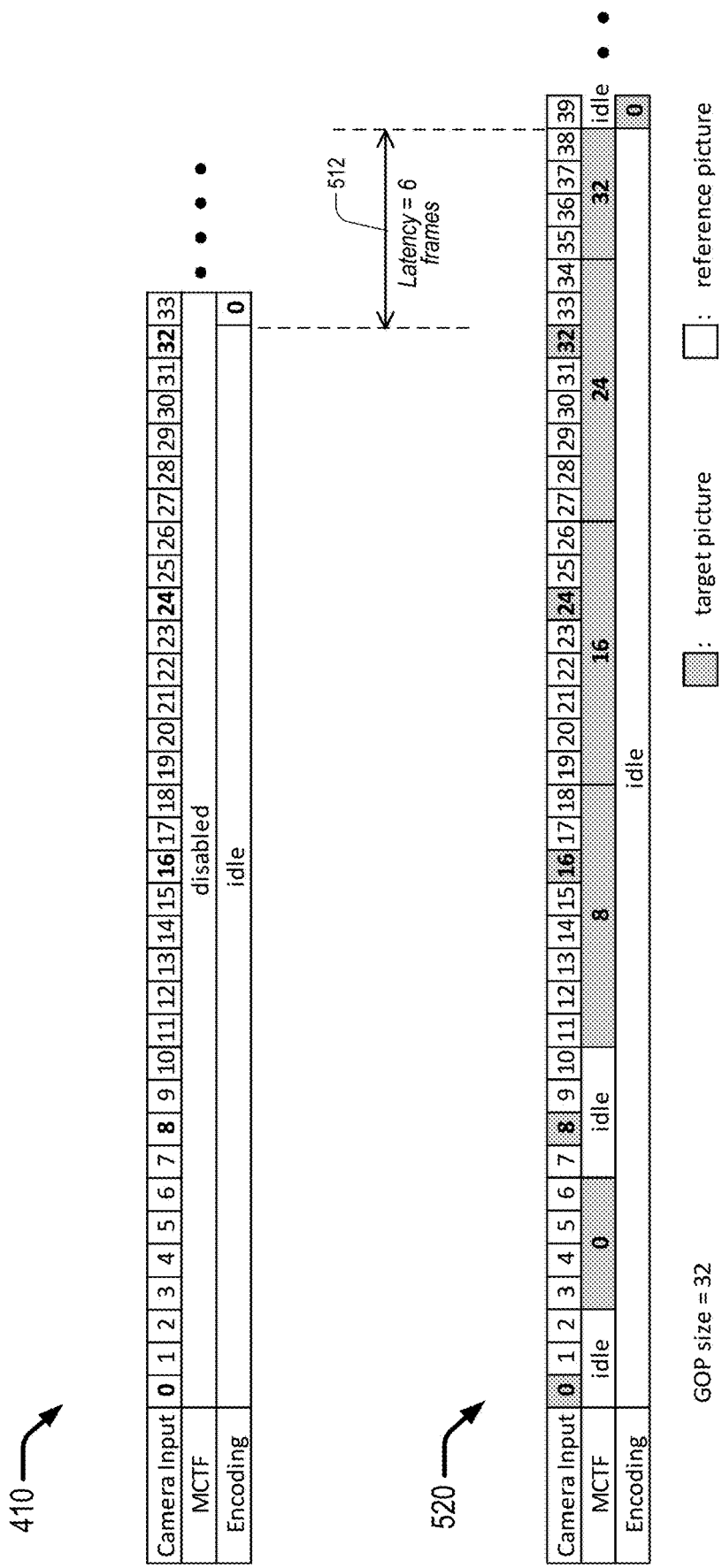
FIG. 5 is a diagram of an example design in accordance with an implementation of the present disclosure.

Various modification may be made to the MCTF pre-encoding process as described elsewhere herein above to shorten the resulted latency and thus to deduce the size of memory buffer needed. In some embodiments, the encoder may determine a fewer number of reference pictures for target picture(s) located towards the end of a GOP. FIG. 5 includes a diagram of an example design in accordance with an implementation of the present disclosure. In FIG. 5, a diagram 520 illustrates an embodiment wherein a target picture of which the POC value is a multiple of the GOP size of the video has fewer reference pictures as compared to another target picture of which the POC value is not a multiple of the POC size. Specifically, the video shown in the diagram 520 has a GOP size of 32 frames, and the filtering interval is determined to be every 8 frames. For target pictures of POC=8, 16 and 24, since their POC values are not multiples of the GOP size, each of the target pictures has four reference pictures including two past frames and two future frames. For the target picture of POC=32, however, has only two reference pictures, i.e., frames of POC=31 and 33. It follows that the MCTF processing for the POC=32 target frame takes only four frames of time to complete. This embodiment pulls in the actual encoding start of the POC=0 frame to be aligned with the receiving of source picture POC=39, as compared to the scenario in the diagram 410, wherein the actual encoding start of the POC=0 frame is aligned with the POC=43 frame. This embodiment reduces the latency from 10 frames (as represented by the latency 412) to 6 frames (as represented by latency 512). The reduced latency also translates directly to a smaller memory buffer needed, as the memory buffer for the scenario depicted in the diagram 520 only needs to buffer the frames of POC=33-38 as opposed to the need to buffer the frames of POC=33-42 as depicted in the diagram 420.

Figure 6:
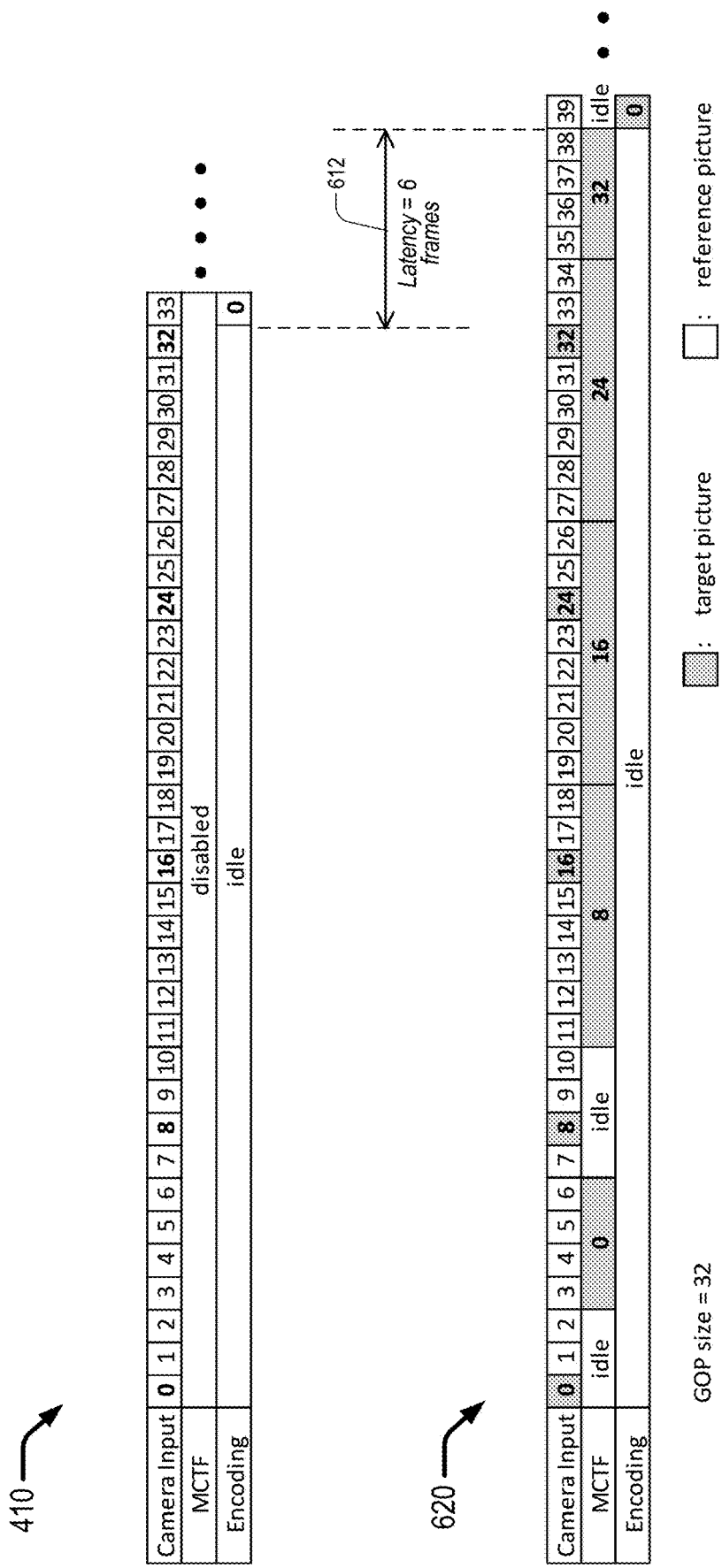
FIG. 6 is a diagram of an example design in accordance with an implementation of the present disclosure.

FIG. 6 includes a diagram of another example design in accordance with an implementation of the present disclosure. In FIG. 6, a diagram 620 illustrates an embodiment wherein a target picture of which the POC value is a multiple of the GOP size of the video has fewer reference pictures as compared to another target picture of which the POC value is not a multiple of the POC size. Specifically, the video shown in the diagram 620 has a GOP size of 32 frames, and the filtering interval is determined to be every 8 frames. For target pictures of POC=8, 16 and 24, since their POC values are not multiples of the GOP size, each of the target pictures has four reference pictures including two past frames and two future frames. For the target picture of POC=32, however, has only two past frames as its reference pictures, i.e., frames of POC=30 and 31. It follows that the MCTF processing for the POC=32 target frame takes only four frames of time to complete. This embodiment pulls in the actual encoding start of the POC=0 frame to be aligned with the receiving of source picture POC=39, as compared to the scenario in the diagram 410, wherein the actual encoding start of the POC=0 frame is aligned with the POC=43 frame. This embodiment reduces the latency from 10 frames (as represented by the latency 412) to 6 frames (as represented by latency 612). The reduced latency also translates directly to a smaller memory buffer needed, as the memory buffer for the scenario depicted in the diagram 620 only needs to buffer the frames of POC=33-38 as opposed to the need to buffer the frames of POC=33-42 as depicted in the diagram 420.

Figure 7:
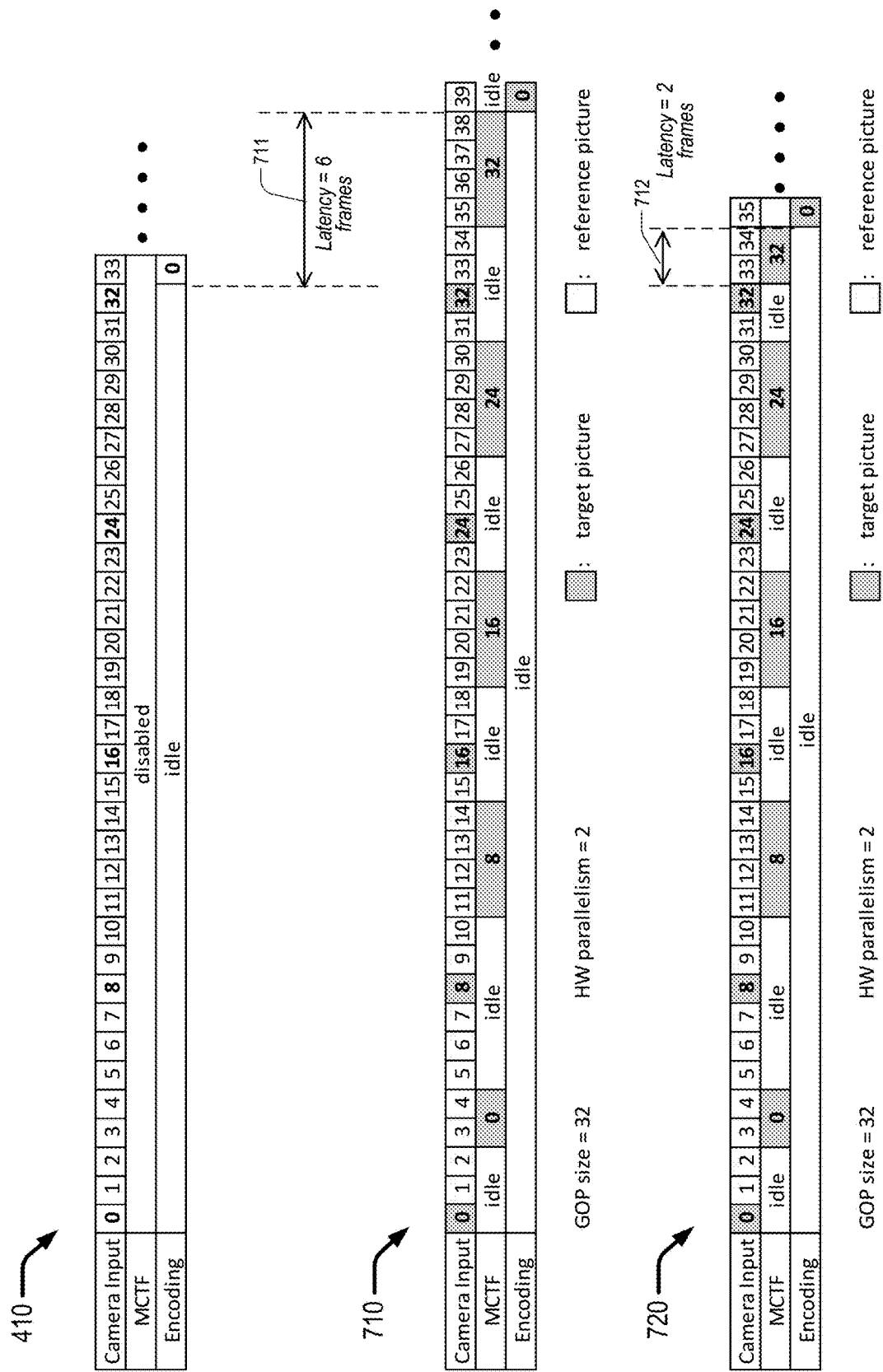
FIG. 7 is a diagram of an example design in accordance with an implementation of the present disclosure.

Another way to reduce the latency caused by MCTF pre-encoding processing is to employ hardware parallelism, two embodiments of which are shown in FIG. 7. In FIG. 7, a diagram 710 illustrates MCTF processing for the same target pictures and corresponding sets of reference pictures as those presented in the diagram 420, but with hardware parallelism of a factor of two. Hardware parallelism of a factor of two cuts the processing time for generating the MCTF filtered pictures by half. Comparing diagrams 420 and 710, the time taken by MCTF processing for the POC=0 target frame is reduced from four frames of time to two frames of time due to the hardware parallelism. Likewise, the time taken by MCTF processing for each of the POC=8, 16, 24 and 32 target frames is also reduced by half, from eight frames of time in the diagram 420 to the four frames of time in the diagram 710. Consequently, the start of the actual video encoding is pulled in by four frames of time, from being aligned with the receiving of the POC=43 frame, as shown in the diagram 420, to being aligned with the receiving of the POC=39 frame, as shown in the diagram 710. Compared with the diagram 410, where MCTF is disabled, the MCTF-caused latency of the diagram 710 is reduced to six frames, as presented by latency 711, with the hardware parallelism.

Similarly, a diagram 720 illustrates MCTF processing for the same target pictures and corresponding sets of reference pictures as those presented in the diagram 620, but with hardware parallelism of a factor of two. Comparing diagrams 620 and 720, the time taken by MCTF processing for each of the POC=0 and 32 target frames is reduced from four frames of time to two frames of time due to the hardware parallelism. Likewise, the time taken by MCTF processing for each of the POC=8, 16 and 24 target frames is also reduced by half, from eight frames of time in the diagram 620 to the four frames of time in the diagram 720. Consequently, the start of the actual video encoding is pulled in by four frames of time, from being aligned with the receiving of the POC=39 frame, as shown in the diagram 420, to being aligned with the receiving of the POC=35 frame, as shown in the diagram 720. Compared with the diagram 410, where MCTF is disabled, the MCTF-caused latency of the diagram 720 is reduced to two frames, as presented by latency 712, with the hardware parallelism.

V. Coding Gain Considerations of MCTF

As shown in each of the diagrams 420, 520, 620, 710 and 720, the MCTF hardware is not always busy, but has intermittent idle time. In some embodiments, the encoder may reduce the idle time of the MCTF hardware by including more reference pictures in generating the filtered pictures for the target pictures. This approach enables a fuller MCTF hardware utilization without introducing extra latency. By including more reference pictures, better filtered pictures may be resulted, leading to an improvement in the coding gain of the encoder.

Figure 8:
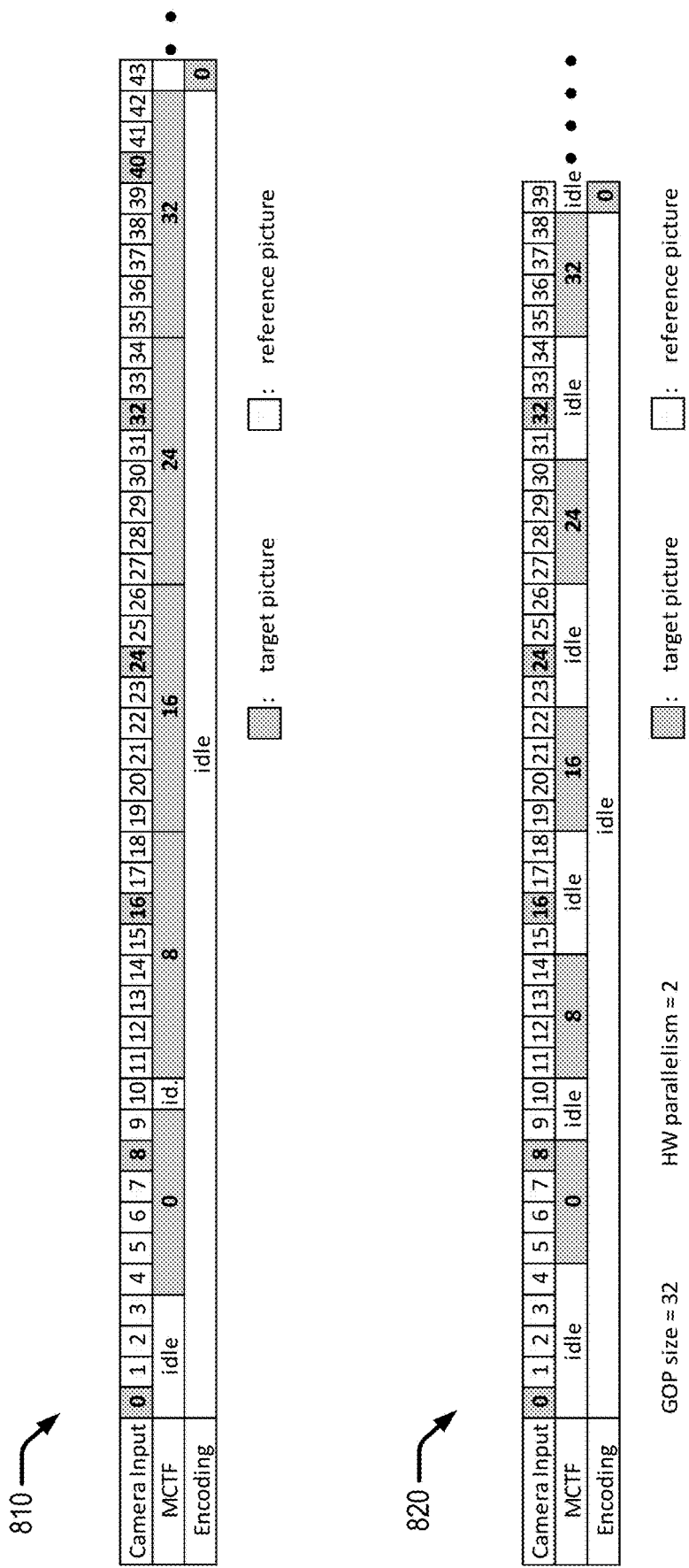
FIG. 8 is a diagram of an example design in accordance with an implementation of the present disclosure.

In some embodiments, the encoder aims to include more reference pictures for the POC=0 target picture. FIG. 8 illustrates two of such embodiments, represented by diagrams 810 and 820, respectively. The diagram 810 is the same as the diagram 420 except that an extra reference picture, the POC=3 frame, is included for the POC=0 target picture. Namely, the MCTF hardware references to three reference pictures, i.e., the POC=1-3 frames, in generating the filtered picture for the POC=0 target picture. As shown in the diagram 810, the onset of the actual video encoding still aligns with the receiving of the POC=43 frame, same as that of the diagram 420, so no extra latency is introduced. Given that the number of reference pictures for the POC=0 target picture increases from two to three, a better filtered picture is expected to replace the POC=0 target picture to be encoded into the bitstream, and the bitstream is thus expected to have a better (i.e., a larger, or more) coding gain. This also reduces the MCTF hardware idle time immediately following the processing of the POC=0 target picture, reducing from four frames as shown in the diagram 420 to just one frame as shown in the diagram 810.

Likewise, the diagram 820 is the same as the diagram 710 except that two extra reference picture, the POC=3 and 4 frames, are included for the POC=0 target picture. Namely, the MCTF hardware references to four reference pictures, i.e., the POC=1-4 frames, in generating the filtered picture for the POC=0 target picture. As shown in the diagram 820, the onset of the actual video encoding still aligns with the receiving of the POC=39 frame, same as that of the diagram 710, so no extra latency is introduced. Given that the number of reference pictures for the POC=0 target picture increases from two to four, a better filtered picture is expected to replace the POC=0 target picture to be encoded into the bitstream, and the bitstream is thus expected to have an even better (i.e., a larger, or more) coding gain than that from the diagram 810. This also reduces the MCTF hardware idle time immediately following the processing of the POC=0 target picture, reducing from six frames as shown in the diagram 710 to two frames as shown in the diagram 820.

In some embodiments in accordance with the present disclosure, the encoder determines the number of reference pictures for a target picture based on the filtering interval. Suppose that the encoder has determined the filtering interval to be N, i.e., every N-th picture in the video stream is chosen to be a target picture. Specifically, for target pictures other than the POC=0 frame, the encoder may determine to have the N neighboring frames as the MCTF reference pictures for the target picture, with half of the N reference pictures having POC values smaller than the POC value of the target picture, and the other half of the N reference pictures having POC values greater than the POC value of the target picture. As to the POC=0 target picture, the encoder may determine the (N/2+k) frames following the POC=0 target picture to be its MCTF reference pictures, where k is a positive integer.

In some embodiments, the encoder aims to improve the coding gain by including more relevant reference frames for a target picture, especially when a theme change of the video happens relatively close to the target picture. In a video stream, frames presented prior to a theme change have a different "theme" from frames coming after the theme change. Therefore, it is typical that the content of the frames prior to the theme change is quite irrelevant to the content of the frames following the theme change. Due to the irrelevance between the two groups of frames, applying MCTF to a group of reference frames that includes frames from both prior to and following the theme change would not result in much coding gain, as a frame prior to the theme change would not help much to predict any frame that comes after the theme change, and vice versa. Depending on whether a target picture is presented before or after a theme change, MCTF would be more efficient to reference to frames presented either solely before or solely after the theme change. That is, MCTF would not be as efficient if there is a theme change happening between a target picture and one of its reference pictures. On the other hand, MCTF is efficient when there is not any theme change between a target picture and all of its reference pictures.

Figure 9:
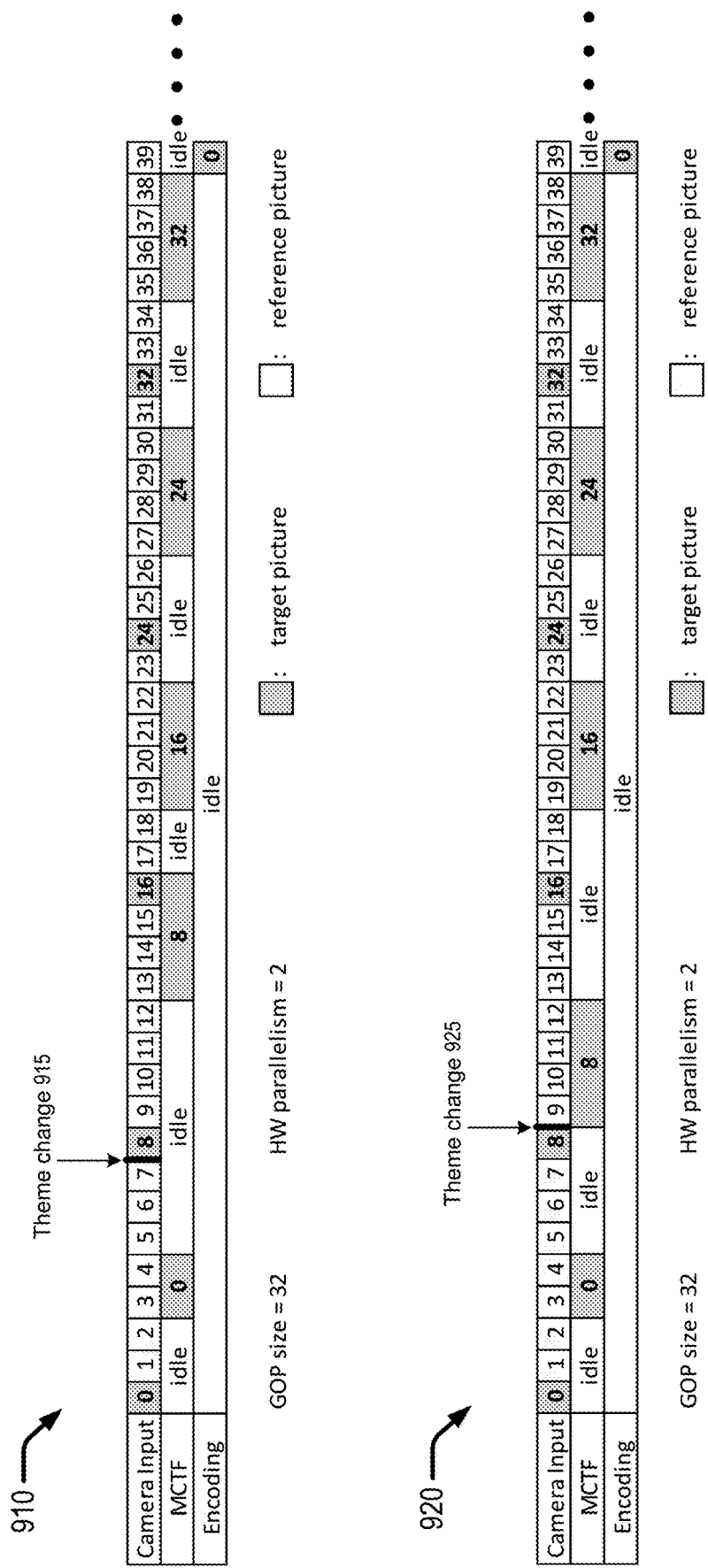
FIG. 9 is a diagram of an example design in accordance with an implementation of the present disclosure.

FIG. 9 illustrates an example design in accordance with an implementation of the present disclosure. In FIG. 9, a diagram 910 illustrates an embodiment which is the same as that of the diagram 710 except that the video in the diagram 910 includes a theme change 915 immediately prior to the POC=8 target picture. In the diagram 710, the encoder determines the frames of POC=6, 7, 9 and 10 as the MCTF reference pictures for the POC=8 target picture. However, this would be a non-ideal choice for the scenario in diagram 910, as the content in the POC=6 and 7 frames would not be much relevant to the POC=8 target picture due to the theme change 915. Instead, as shown in the diagram 910, the encoder determines the frames of POC=9, 10, 11 and 12 to be the MCTF reference pictures for the POC=8 target picture, as there is no theme change introduced between the POC=8 target picture and the POC=9, 10, 11 and 12 reference pictures. As a result, a more preferrable coding gain is achieved.

Likewise, a diagram 920 illustrates an embodiment which is the same as that of the diagram 710 except that the video in the diagram 920 includes a theme change 925 immediately following the POC=8 target picture. In the diagram 710, the encoder determines the frames of POC=6, 7, 9 and 10 as the MCTF reference pictures for the POC=8 target picture. However, this would be a non-ideal choice for the scenario in diagram 910, as the content in the POC=9 and 10 frames would not be much relevant to the POC=8 target picture due to the theme change 925. Instead, as shown in the diagram 920, the encoder determines the frames of POC=4, 5, 6 and 7 to be the MCTF reference pictures for the POC=8 target picture, as there is no theme change introduced between the POC=8 target picture and the POC=4, 5, 6 and 7 reference pictures. As a result, a more preferrable coding gain is achieved.

VI. Illustrative Implementations

Figure 10:
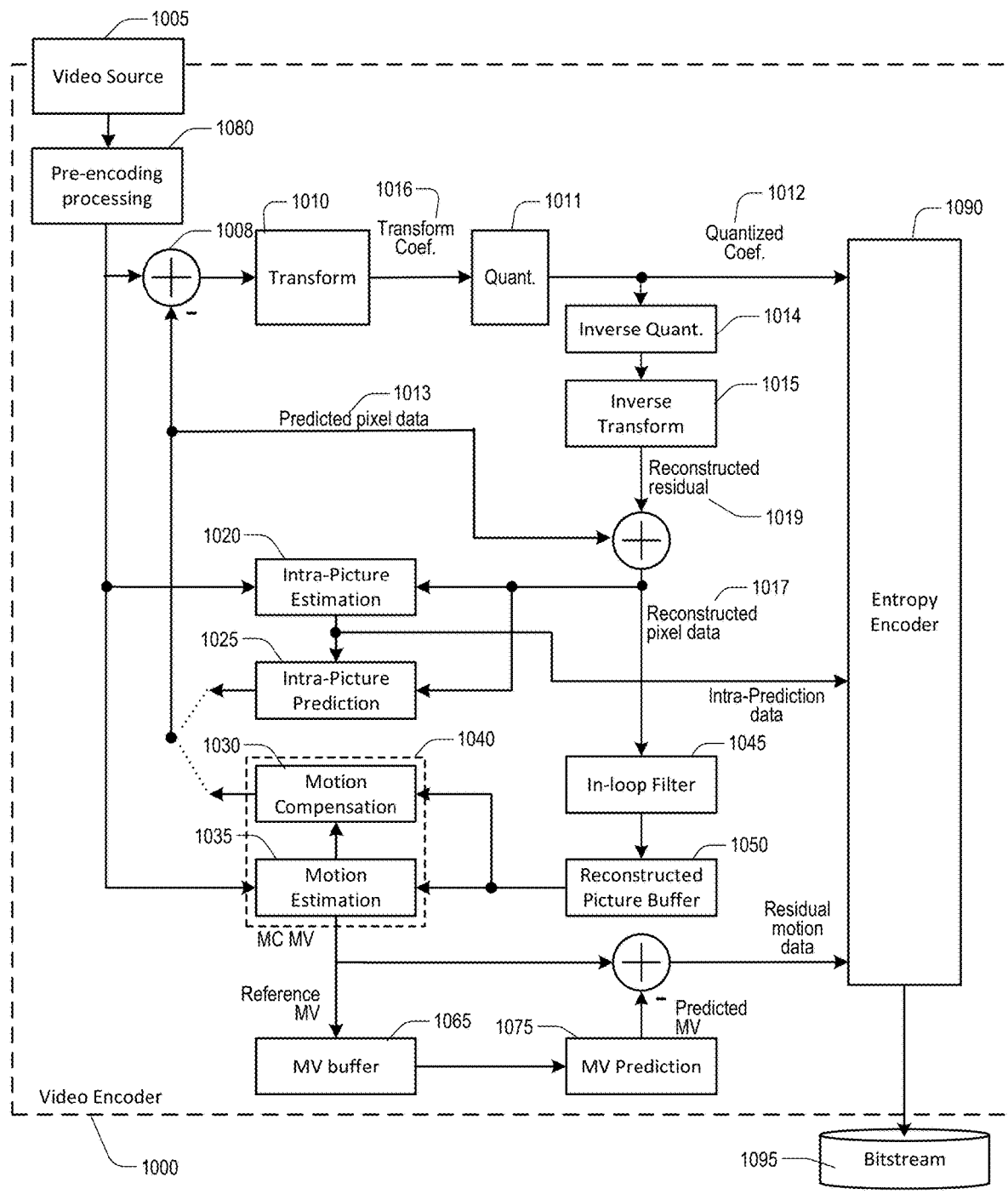
FIG. 10 is a diagram of an example video encoder in accordance with an implementation of the present disclosure.

FIG. 10 illustrates an example video encoder 1000. As illustrated, the video encoder 1000 receives input video signal from a video source 1005 and encodes the signal into bitstream 1095. The video encoder 1000 has several components or modules for encoding the signal from the video source 1005, at least including some components selected from a pre-encoding processing module 1080, a transform module 1010, a quantization module 1011, an inverse quantization module 1014, an inverse transform module 1015, an intra-picture estimation module 1020, an intra-prediction module 1025, a motion compensation module 1030, a motion estimation module 1035, an in-loop filter 1045, a reconstructed picture buffer 1050, a motion vector (MV) buffer 1065, a MV prediction module 1075, and an entropy encoder 1090. The motion compensation module 1030 and the motion estimation module 1035 are part of an inter-prediction module 1040. The inter-prediction module 1040 may include an integer motion estimation (IME) kernel which is configured to perform integer pixel search, as well as a fractional motion estimation (FME) kernel which is configured to perform fractional pixel search. Both the integer pixel search and the fractional pixel search are essential functions for the motion compensation module 1030 and the motion estimation module 1035. The pre-encoding processing module 1080 may be an embodiment of the pre-encoding processing module 132, whereas the rest of the parts of the video encoder 1000 may collectively embody the video encoder 134.

In some embodiments, the modules 1010-1090 as listed above are modules of software instructions being executed by one or more processing units (e.g., a processor) of a computing device or electronic apparatus. In some embodiments, the modules 1010-1090 are modules of hardware circuits implemented by one or more integrated circuits (ICs) of an electronic apparatus. Though the modules 1010-1090 are illustrated as being separate modules, some of the modules can be combined into a single module.

The video source 1005 provides a raw video signal that presents pixel data of each video frame without compression. That is, the video source 1005 provides a video stream comprising source pictures presented in a temporal sequence. The pre-encoding processing module 1080 takes the video stream as input and perform pre-encoding MCTF processing according to one or more embodiments described elsewhere herein above. The processed video data, comprising all the source pictures that are not selected as target pictures for the pre-encoding MCTF processing, plus the filtered pictures that replaces the target pictures in the temporal sequence, is sent to other modules of the video encoder 1000 for actual encoding of the video.

A subtractor 1008 computes the difference between the processed video data generated by the pre-encoding processing module 1080 and the predicted pixel data 1013 from the motion compensation module 1030 or intra-prediction module 1025. The transform module 1010 converts the difference (or the residual pixel data or residual signal 1009) into transform coefficients (e.g., by performing Discrete Cosine Transform, or DCT). The quantization module 1011 quantizes the transform coefficients into quantized data (or quantized coefficients) 1012, which is encoded into the bitstream 1095 by the entropy encoder 1090.

The inverse quantization module 1014 de-quantizes the quantized data (or quantized coefficients) 1012 to obtain transform coefficients, and the inverse transform module 1015 performs inverse transform on the transform coefficients to produce reconstructed residual 1019. The reconstructed residual 1019 is added with the predicted pixel data 1013 to produce reconstructed pixel data 1017. In some embodiments, the reconstructed pixel data 1017 is temporarily stored in a line buffer (not illustrated) for intra-picture prediction and spatial MV prediction. The reconstructed pixels are filtered by the in-loop filter 645 and stored in the reconstructed picture buffer 1050. In some embodiments, the reconstructed picture buffer 1050 is a storage external to the video encoder 1000. In some embodiments, the reconstructed picture buffer 1050 is a storage internal to the video encoder 1000.

The intra-picture estimation module 1020 performs intra-prediction based on the reconstructed pixel data 1017 to produce intra prediction data. The intra-prediction data is provided to the entropy encoder 1090 to be encoded into bitstream 1095. The intra-prediction data is also used by the intra-prediction module 1025 to produce the predicted pixel data 1013.

The motion estimation module 1035 performs inter-prediction by producing MVs to reference pixel data of previously decoded frames stored in the reconstructed picture buffer 1050. These MVs are provided to the motion compensation module 1030 to produce predicted pixel data.

Instead of encoding the complete actual MVs in the bitstream, the video encoder 1000 uses MV prediction to generate predicted MVs, and the difference between the MVs used for motion compensation and the predicted MVs is encoded as residual motion data and stored in the bitstream 1095.

The MV prediction module 1075 generates the predicted MVs based on reference MVs that were generated for encoding previously video frames, i.e., the motion compensation MVs that were used to perform motion compensation. The MV prediction module 1075 retrieves reference MVs from previous video frames from the MV buffer 1065. The video encoder 1000 stores the MVs generated for the current video frame in the MV buffer 1065 as reference MVs for generating predicted MVs.

The MV prediction module 1075 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1095 by the entropy encoder 1090.

The entropy encoder 1090 encodes various parameters and data into the bitstream 1095 by using entropy-coding techniques such as context-adaptive binary arithmetic coding (CABAC) or Huffman encoding. The entropy encoder 1090 encodes various header elements, flags, along with the quantized transform coefficients 1012, and the residual motion data as syntax elements into the bitstream 1095. The bitstream 1095 is in turn stored in a storage device or transmitted to a decoder over a communications medium such as a network.

The in-loop filter 1045 performs filtering or smoothing operations on the reconstructed pixel data 1017 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 11:
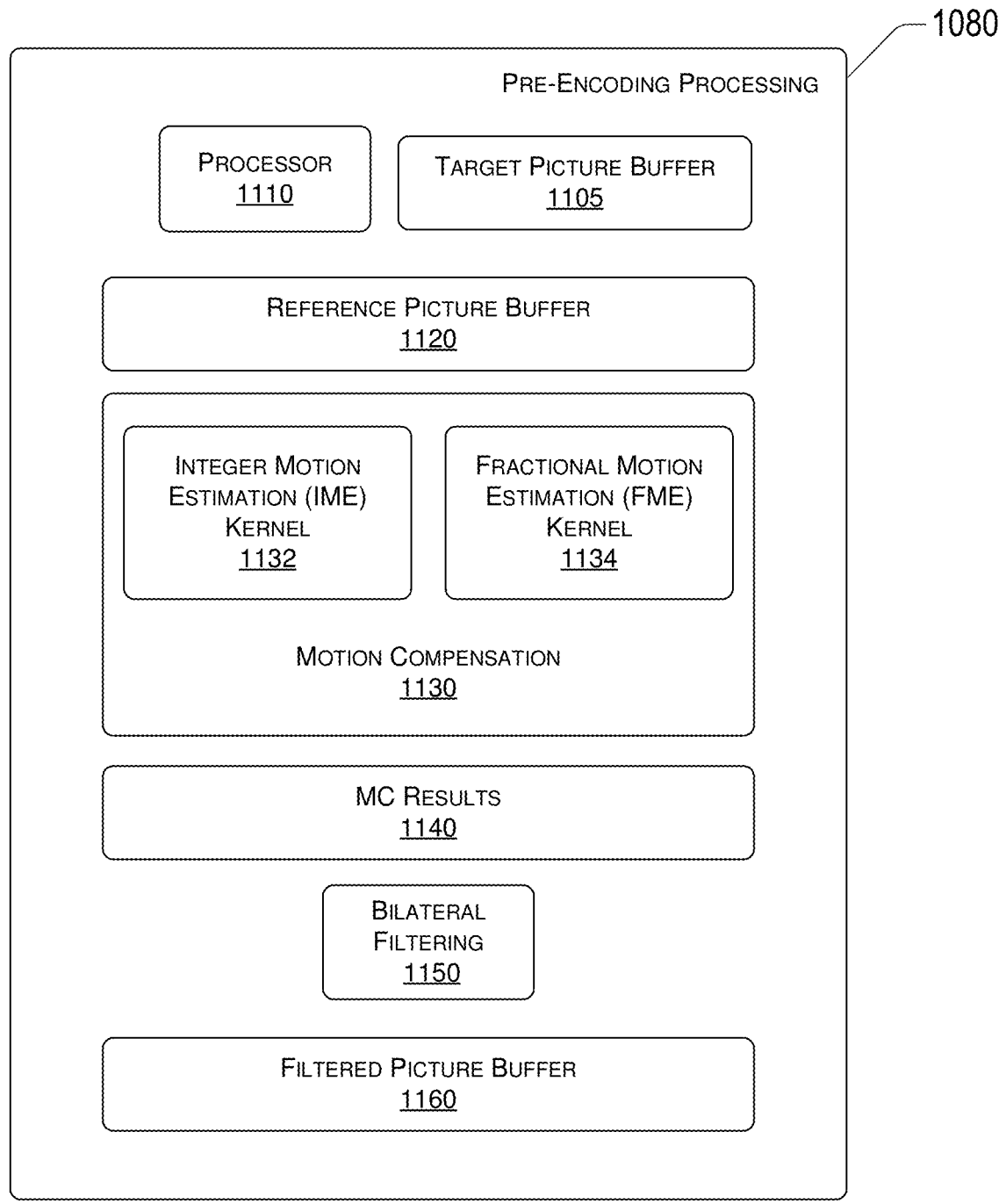
FIG. 11 is a diagram of an example pre-encoding processing apparatus in accordance with an implementation of the present disclosure.

FIG. 11 illustrates portions of the video encoder 1000 that implement the pre-encoding processing module 1080. As illustrated, the pre-encoding processing module 1080 includes a processor 1110, a target picture buffer 1105, a reference buffer 1120, a motion compensation module 1130, a MC result buffer 1140, a bilateral filtering module 1150, and a filtered picture buffer 1160. The processor 1110 is configured to receive and analyze the raw video stream of the raw pixel frames from the video source 1005 to identify or otherwise parse certain parameters of the video stream such as GOP size. The processor 1110 may also identify whether each frame includes NI subpicture(s) and SCI subpicture(s). The processor 1110 may further identify location(s) of theme change event(s), if any, in the video stream. The processor 1110 may, based on the analysis of the raw video data, determine a MCTF filtering interval as well as a plurality of target pictures to which MCTF is to be applied. The processor 1110 may store the a plurality of target pictures in the target picture buffer 1105. Additionally, the processor 1110 may determine, for each target picture, one or more reference pictures to be used for MCTF. The processor 1110 may store the one or more reference pictures for each target picture in the reference picture buffer 1120.

The motion compensation module 1130 is configured to access the reference picture buffer 1120 and perform motion estimation (ME) and motion compensation (MC) operations to the reference pictures for generating MC results for the target pictures as described elsewhere herein above. The motion compensation module 1130 may divide each target picture and each of the corresponding reference picture(s) into multiple prediction blocks before the motion compensation module 1130 performs the ME and MC operations. The motion compensation module 1130 may include an integer motion estimation (IME) kernel 1132 which is configured to perform integer pixel search for finding best-matching blocks for the prediction blocks in the reference pictures. The motion compensation module 1130 may further include a fractional motion estimation (FME) kernel 1134 which is configured to perform fractional pixel search (e.g., ½-pel search or ¼-pel search) for finding best-matching blocks for the prediction blocks in the reference pictures. The motion compensation module 1130 may perform the ME and MC operations by involving the IME kernel 1132 and/or the FME kernel 1134. In some embodiments, the video encoder 1000 may share or reuse a same circuitry or hardware that serves as both the IME kernel 1132 and the IME kernel inside the inter-prediction module 1040. Likewise, the video encoder 1000 may share or reuse a same circuitry or hardware that serves as both the FME kernel 1132 and the FME kernel inside the inter-prediction module 1040. The MC results generated by the motion compensation module 1130 may be stored in the MC result buffer 1140.

The bilateral filtering module 1150 may access the MC result buffer 1140 and accordingly perform pixel-by-pixel bilateral filtering to the MC results, thereby generating a filtered picture for each target picture as described elsewhere herein above. The generated filtered pictures may be stored in the filtered picture buffer 1160. The reference pictures stored in the reference picture buffer 1120 and the filtered pictures stored in the filtered picture buffer 1160 are subsequently encoded by other modules of the video encoder 1000 into the bitstream 1095.

Figure 12:
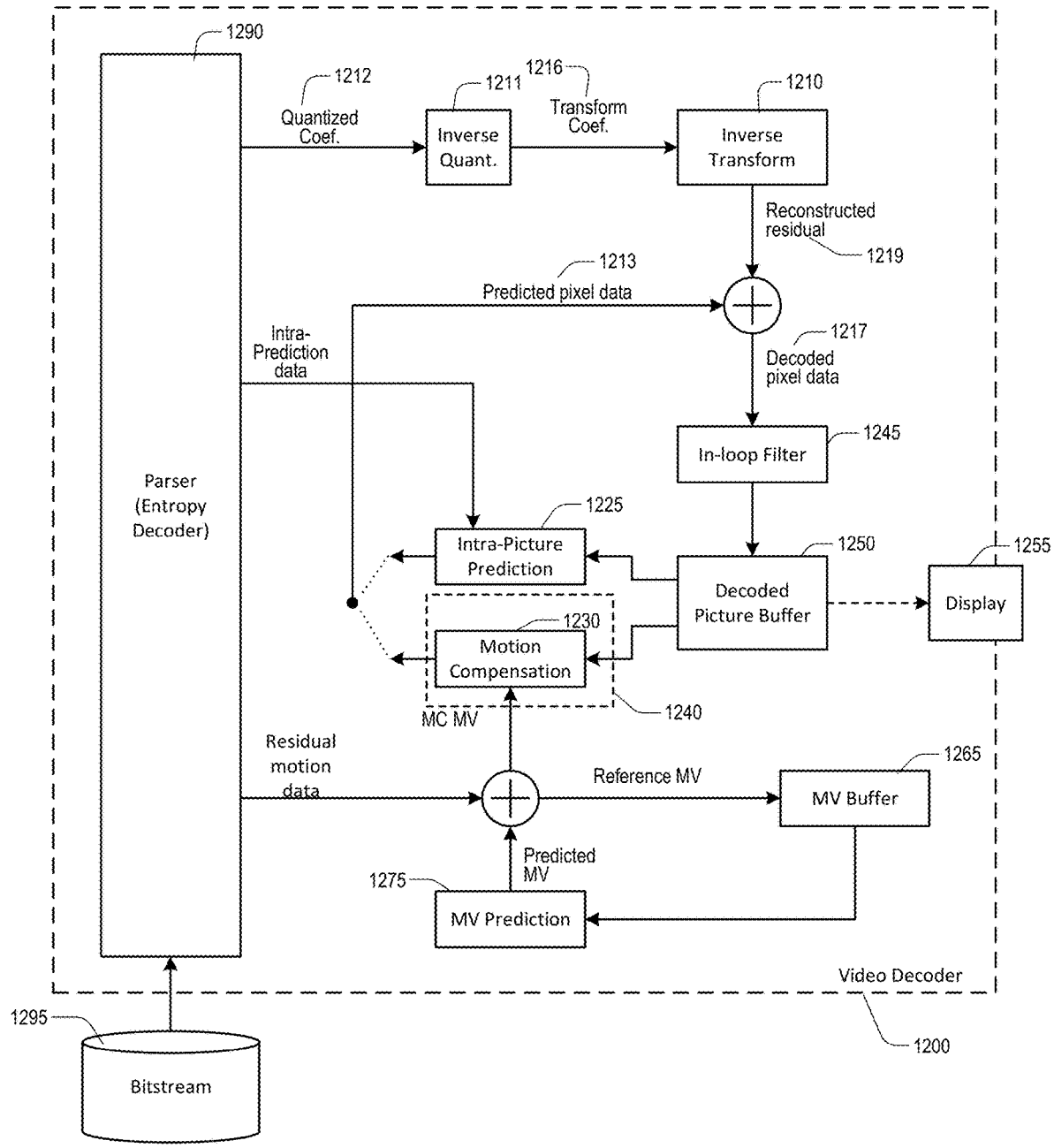
FIG. 12 is a diagram of an example video decoder in accordance with an implementation of the present disclosure.

FIG. 12 illustrates an example video decoder 1200. As illustrated, the video decoder 1200 is an image-decoding or video-decoding circuit that receives a bitstream 1295 and decodes the content of the bitstream 1295 into pixel data of video frames for display. The video decoder 1200 has several components or modules for decoding the bitstream 1295, including some components selected from an inverse quantization module 1211, an inverse transform module 1210, an intra-prediction module 1225, a motion compensation module 1230, an in-loop filter 1245, a decoded picture buffer 1250, a MV buffer 1265, a MV prediction module 1275, and a parser 1290. The motion compensation module 1230 is part of an inter-prediction module 1240.

In some embodiments, the modules 1210-1290 are modules of software instructions being executed by one or more processing units (e.g., a processor) of a computing device. In some embodiments, the modules 1210-1290 are modules of hardware circuits implemented by one or more Ics of an electronic apparatus. Though the modules 1210-1290 are illustrated as being separate modules, some of the modules can be combined into a single module.

The parser (e.g., an entropy decoder) 1290 receives the bitstream 1295 and performs initial parsing according to the syntax defined by a video-coding or image-coding standard. The parsed syntax element includes various header elements, flags, as well as quantized data (or quantized coefficients) 1212. The parser 1290 parses out the various syntax elements by using entropy-coding techniques such as context-adaptive binary arithmetic coding (CABAC) or Huffman encoding.

The inverse quantization module 1211 de-quantizes the quantized data (or quantized coefficients) 1212 to obtain transform coefficients, and the inverse transform module 1210 performs inverse transform on the transform coefficients 1216 to produce reconstructed residual signal 1219. The reconstructed residual signal 12112 is added with predicted pixel data 1213 from the intra-prediction module 1225 or the motion compensation module 1230 to produce decoded pixel data 1217. The decoded pixels data are filtered by the in-loop filter 1245 and stored in the decoded picture buffer 1250. In some embodiments, the decoded picture buffer 1250 is a storage external to the video decoder 1200. In some embodiments, the decoded picture buffer 1250 is a storage internal to the video decoder 1200.

The intra-prediction module 1225 receives intra-prediction data from bitstream 1295 and according to which, produces the predicted pixel data 1213 from the decoded pixel data 1217 stored in the decoded picture buffer 1250. In some embodiments, the decoded pixel data 1217 is also stored in a line buffer (not illustrated) for intra-picture prediction and spatial MV prediction.

In some embodiments, the content of the decoded picture buffer 1250 is used for display. A display device 1255 either retrieves the content of the decoded picture buffer 1250 for display directly or retrieves the content of the decoded picture buffer to a display buffer. In some embodiments, the display device receives pixel values from the decoded picture buffer 1250 through a pixel transport.

The motion compensation module 1230 produces predicted pixel data 1213 from the decoded pixel data 1217 stored in the decoded picture buffer 1250 according to motion compensation MVs (MC MVs). These motion compensation MVs are decoded by adding the residual motion data received from the bitstream 1295 with predicted MVs received from the MV prediction module 1275.

The MV prediction module 1275 generates the predicted MVs based on reference MVs that were generated for decoding previous video frames, e.g., the motion compensation MVs that were used to perform motion compensation. The MV prediction module 1275 retrieves the reference MVs of previous video frames from the MV buffer 1265. The video decoder 1200 stores the motion compensation MVs generated for decoding the current video frame in the MV buffer 1265 as reference MVs for producing predicted MVs.

The in-loop filter 1245 performs filtering or smoothing operations on the decoded pixel data 1217 to reduce the artifacts of coding, particularly at boundaries of pixel blocks. In some embodiments, the filtering operation performed includes sample adaptive offset (SAO). In some embodiment, the filtering operations include adaptive loop filter (ALF).

VII. Illustrative Processes

Figure 13:
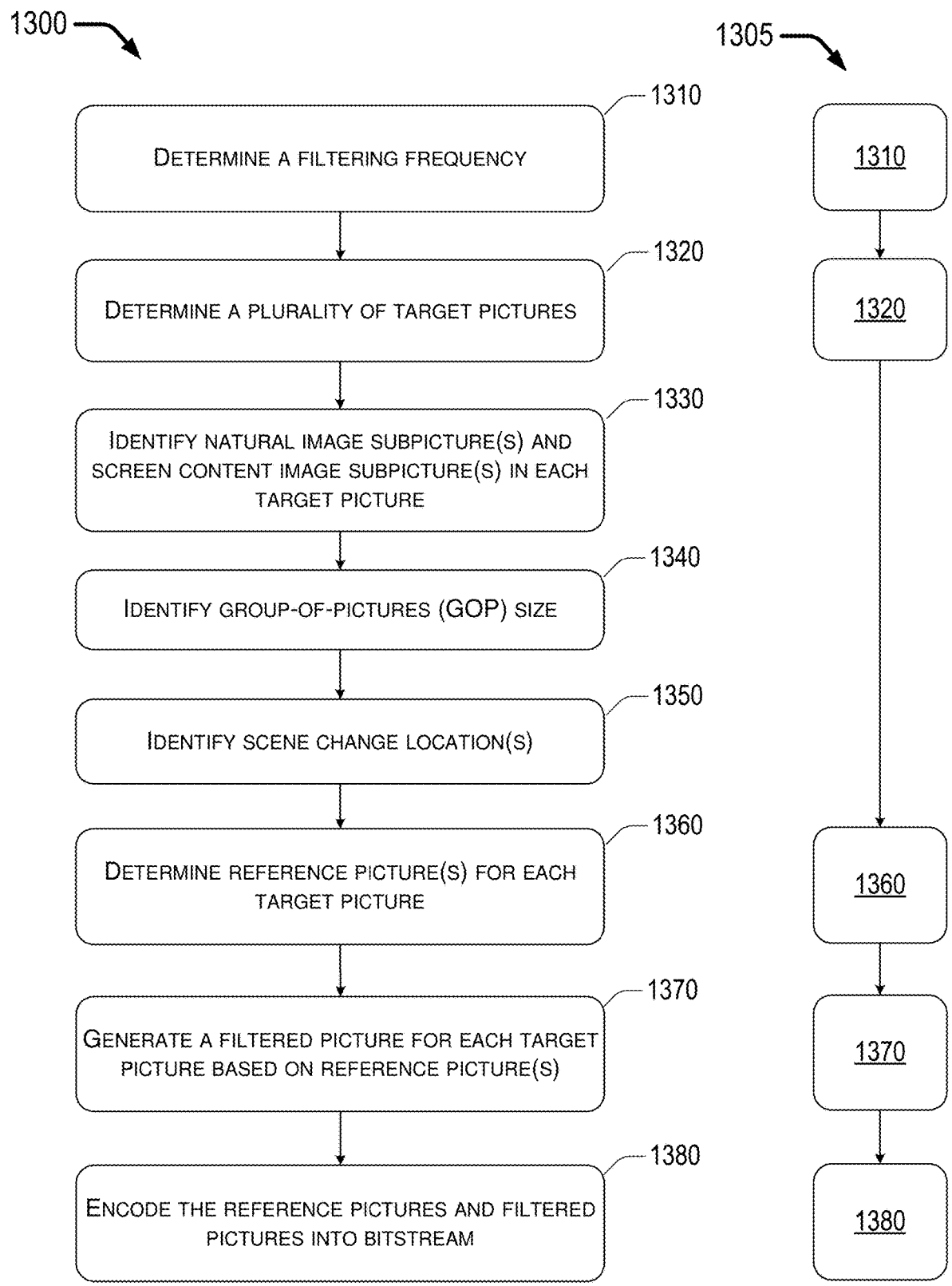
FIG. 13 illustrates flowcharts each representing an example process in accordance with an implementation of the present disclosure.

FIG. 13 illustrates example processes 1300 and 1305 in accordance with an implementation of the present disclosure. Process 1300 and process 1305 may each represent an aspect of implementing various proposed designs, concepts, schemes, systems and methods described above. More specifically, process 1300 and process 1305 may each represent an aspect of the proposed concepts and schemes pertaining to pre-encoding process of a video stream in accordance with the present disclosure. Process 1300 and process 1305 may each include one or more operations, actions, or functions as illustrated by one or more of blocks 1310, 1320, 1330, 1340, 1350, 1360, 1370 and 1380. Although illustrated as discrete blocks, various blocks of process 1300 or process 1305 may be divided into additional blocks, combined into fewer blocks, or eliminated, depending on the desired implementation. Moreover, the blocks/sub-blocks of process 1300 and process 1305 may be executed in the order shown in FIG. 13 or, alternatively in a different order. Furthermore, one or more of the blocks/sub-blocks of process 1300 or process 1305 may be executed repeatedly or iteratively. Process 1300 and process 1305 may each be implemented by or in the apparatus 1000 as well as any variations thereof. Solely for illustrative purposes and without limiting the scope, process 1300 and process 1305 are described below in the context of apparatus 1000 as the pre-encoding processing unit 1080. Process 1300 may begin at block 1310. Process 1305 may also begin at block 1310.

At 1310, process 1300 and process 1305 may involve the processor 1110 of the apparatus 1080 receiving a video stream having source pictures presented (e.g., recorded or displayed) in a temporal sequence. Each of the source pictures may be associated with a temporal identifier (e.g., a POC value) that identifies a temporal location of the source picture in the temporal sequence. The processor 1110 may accordingly determine a filtering interval, expressed as repeating every certain number of frames, based on which MCTF is to be applied. Process 1300 may proceed from 1310 to 1320. Process 1305 may also proceed from 1310 to 1320.

At 1320, process 1300 and process 1305 may involve the processor 1110 determining or selecting a plurality of target pictures based on the filtering interval. Each of the target pictures is a source picture of the video stream. The target pictures may be stored in the target picture buffer 1105.

Process 1300 may proceed from 1320 to 1330. Process 1305 may proceed from 1320 to 1360.

At 1330, process 1300 may involve processor 1110 analyzing the target pictures stored in the target picture buffer 1105 and finding or otherwise identifying, for each target picture, region(s) containing natural image (NI) and region(s) containing screen content image (SCI). In some implementations, the region(s) may be one or more subpictures. A subpicture may be one or more slices or tiles that is consist of a plurality of neighboring CTUs. Process 1300 may proceed from 1330 to 1340.

At 1340, process 1300 may involve the processor 1110 identifying the GOP size of the video stream. Process 1300 may proceed from 1340 to 1350.

At 1350, process 1300 may involve the processor identifying location(s) of theme change, if any, in the video stream. Process 1300 may proceed from 1350 to 1360.

At 1360, process 1300 and process 1305 may involve the processor 1110 determining one or more reference pictures for each target picture. Process 1300 may proceed from 1360 to 1370. Process 1305 may also proceed from 1360 to 1370.

In some implementations, in determining the one or more reference pictures for each target picture, the processor 1110 may generate different numbers of reference pictures for different target pictures according to whether the POC value of a target picture is a multiple of the GOP size. In an event that the POC value is a multiple of the GOP size, the processor 1110 may determine fewer reference pictures for the target picture. In an event that the POC value is not a multiple of the GOP size, the processor 1110 may determine more reference pictures for the target picture.

In some implementations, in an event that the POC value of a target picture is a multiple of the GOP size, the processor 1110 may determine the reference pictures of the target picture to include only past frames as compared to the target picture, i.e., frames with POC values smaller than the POC value of the target picture. Namely, only frames having a temporal location earlier in the temporal sequence of the video stream than the temporal location of the target picture can be a reference picture of the target picture.

In some implementations, in an event that there is a scene change immediately before a target picture in the temporal sequence of the video, the processor 1110 may determine the reference pictures of the target picture to include only future frames as compared to the target picture, i.e., frames with POC values greater than the POC value of the target picture. Namely, only frames having a temporal location later in the temporal sequence of the video stream than the temporal location of the target picture can be a reference picture of the target picture.

In some implementations, in an event that there is a scene change immediately following a target picture in the temporal sequence of the video, the processor 1110 may determine the reference pictures of the target picture to include only past frames as compared to the target picture, i.e., frames with POC values smaller than the POC value of the target picture. Namely, only frames having a temporal location earlier in the temporal sequence of the video stream than the temporal location of the target picture can be a reference picture of the target picture.

In some implementations, the processor 1110 may determine the reference pictures for the target pictures such that none of the scene change events of the video happens between a target picture and the reference pictures determined for the target picture.

At 1370, process 1300 and process 1305 may involve the apparatus 1080 generating a filtered picture for each target picture. The generating of the filtered pictures involves the apparatus 1080 performing pixel-based filtering (e.g., MCTF) using the reference pictures corresponding to the respective target picture. Process 1300 and process 1305 may also involve the apparatus 1080 storing the filtered pictures generated by the bilateral filtering module 1150 into the filtered picture buffer 1160. Process 1300 may proceed from 1370 to 1380. Process 1305 may also proceed from 1370 to 1380.

In some implementations, in generating the filtered pictures, the apparatus 1080 applies the pixel-based filtering only for NI subpicture(s) but not for SCI subpicture(s). That is, the pixel-based filtering only applies to NI subpicture(s) of a target picture, but not to any SCI subpicture of the target picture.

In some implementations, in generating each of the filtered pictures, the apparatus 1080 applies the pixel-based filtering for both NI and SCI subpictures. However, the apparatus 1080 references to more reference pictures for NI subpicture(s) of the target picture, but to fewer reference pictures for SCI subpicture(s).

In some implementations, in generating the filtered pictures, process 1300 and process 1305 may involve the motion compensation module 1130 dividing each target picture into multiple prediction blocks. The prediction blocks may be of same size or different sizes. Process 1300 and process 1305 may also involve the motion compensation module 1130 determining, for each prediction block, a plurality of MC results, wherein each of the MC results is determined based on a respective reference picture of the reference pictures that are corresponding to the target picture. Process 1300 and process 1305 may also involve the motion compensation module 1130 performing bilateral filtering for each pixel of each prediction block, wherein the performing of the bilateral filtering is based on the MC results as determined.

In some implementations, each of the MC results of a prediction block includes a best matching block and a loss value. The best-matching block may have same width and height as the respective prediction block. In addition, the loss value may represent a difference between the best-matching block and the respective prediction block. Moreover, process 1300 and process 1305 may involve the bilateral filtering module 1150 performing the bilateral filtering by calculating, for each pixel of the prediction block, a weighted sum based on corresponding pixel values of the best-matching block and the loss values of the MC results.

In some implementations, in determining the MC results for each prediction block, process 1300 and process 1305 may involve the motion compensation module 1130 performing an integer pixel search, a fractional pixel search, or both, based on the respective prediction block and the one or more reference pictures.

At 1380, process 1300 and process 1305 may involve the video encoder 1000 encoding the video into the bitstream 1095. In particular, the video encoder 1000 may encode the filtered pictures generated by the apparatus 1080 and stored in the filtered picture buffer 1160 thereof. The video encoder 1000 may further encode the source pictures that are not determined to be the target pictures into the bitstream 1095 as well.

Figure 14:
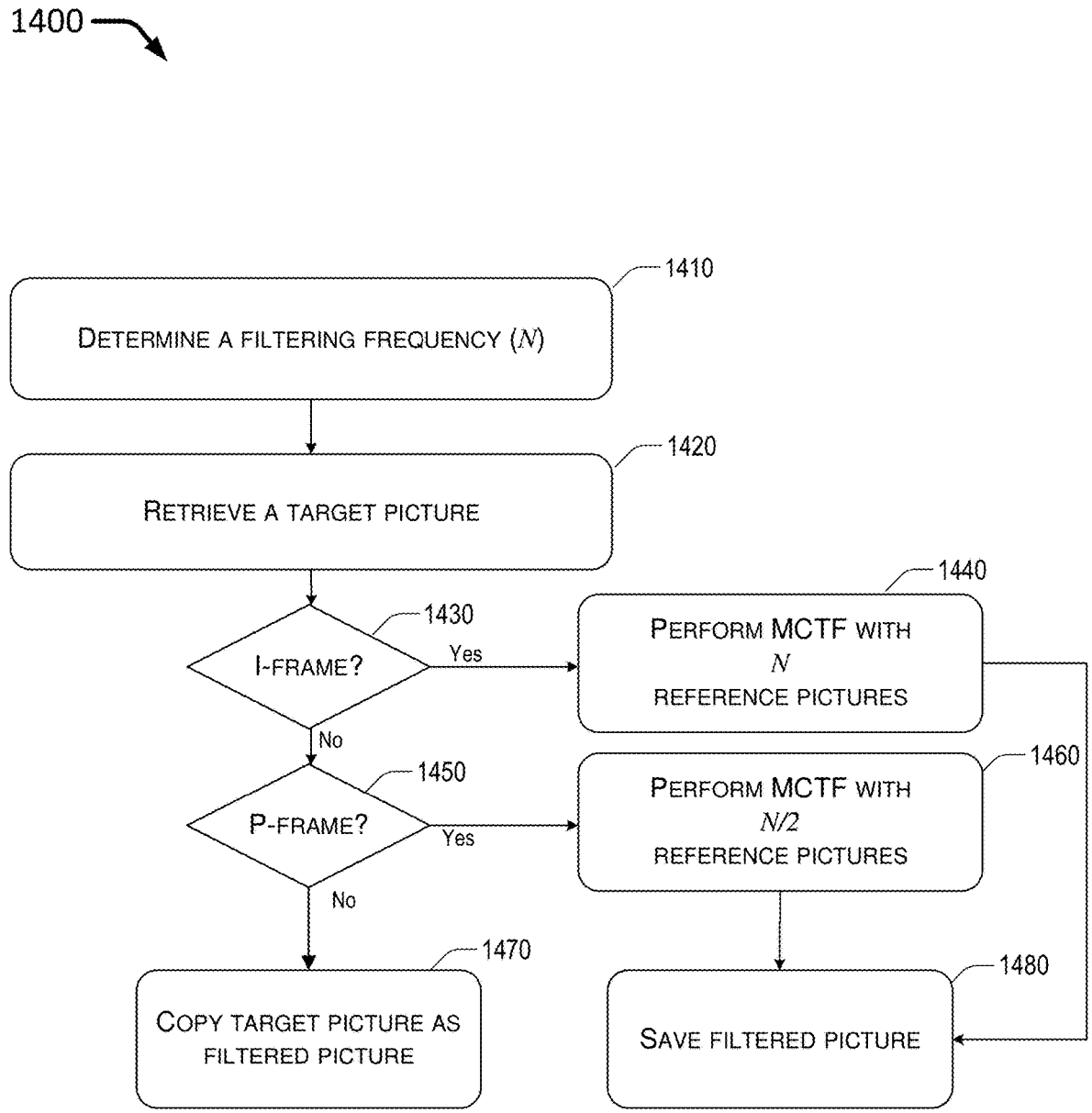
FIG. 14 is a flowchart of an example process in accordance with an implementation of the present disclosure.

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to a pre-encoding process of a video stream in accordance with the present disclosure. Process 1400 may include one or more operations, actions, or functions as illustrated by one or more of blocks 1410, 1420, 1430, 1440, 1450, 1460, 1470 and 1480. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively in a different order. Furthermore, one or more of the blocks/sub-blocks of process 1400 may be executed repeatedly or iteratively. Process 1400 may be implemented by or in the apparatus 1080 as well as any variations thereof. Solely for illustrative purposes and without limiting the scope, process 1400 is described below in the context of apparatus 1000 as the pre-encoding processing unit 1080. Process 1400 may begin at block 1410.

At 1410, process 1400 may involve the processor 1110 of the apparatus 1080 determining a filtering interval of every N frames. Process 1400 may proceed from 1410 to 1420.

At 1420, process 1400 may involve the motion compensation module 1130 retrieving a target picture from the target picture buffer 1105. Process 1400 may proceed from 1420 to 1430.

At 1430, process 1400 may involve the processor 1110 determining whether the target picture is an I-frame. In an event that the target picture is an I-frame, process 1400 may proceed from 1430 to 1440. In an event that the target picture is not an I-frame, process 1400 may proceed from 1430 to 1450.

At 1440, process 1400 may involve the apparatus 1080 performing MCTF with N reference pictures, wherein N equals to the filtering interval. Process 1400 may proceed from 1440 to 1480.

At 1450, process 1400 may involve the processor 1110 determining whether the target picture is a P-frame. In an event that the target picture is a P-frame, process 1400 may proceed from 1450 to 1460. In an event that the target picture is not a P-frame, process 1400 may proceed from 1450 to 1470.

At 1460, process 1400 may involve the apparatus 1080 performing MCTF with N/2 reference pictures, wherein N equals to the filtering interval. Process 1400 may proceed from 1460 to 1480.

At 1470, process 1400 may involve the processor 1110 copying the target picture to the filtered picture buffer 1160 to store as its filtered picture.

At 1480, process 1400 may involve the processor 1110 storing the filtered picture to the filtered picture buffer 1160.

Figure 15:
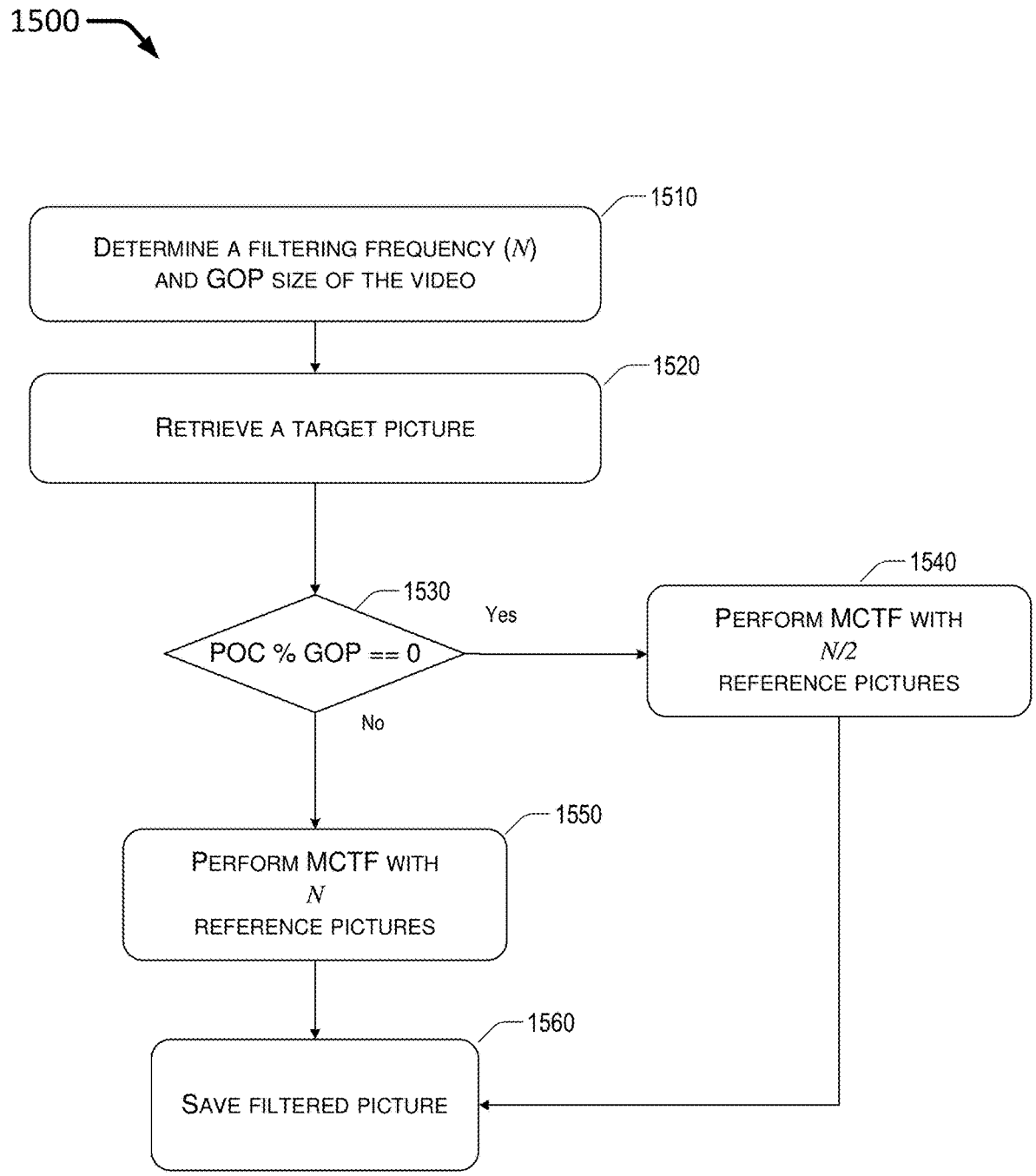
FIG. 15 is a flowchart of an example process in accordance with an implementation of the present disclosure.

FIG. 15 illustrates an example process 1500 in accordance with an implementation of the present disclosure. Process 1500 may represent an aspect of implementing various proposed designs, concepts, schemes, systems and methods described above. More specifically, process 1500 may represent an aspect of the proposed concepts and schemes pertaining to a pre-encoding process of a video stream in accordance with the present disclosure. Process 1500 may include one or more operations, actions, or functions as illustrated by one or more of blocks 1510, 1520, 1530, 1540, 1550 and 1560. Although illustrated as discrete blocks, various blocks of process 1500 may be divided into additional blocks, combined into fewer blocks, or eliminated, depending on the desired implementation. Moreover, the blocks/sub-blocks of process 1500 may be executed in the order shown in FIG. 15 or, alternatively in a different order. Furthermore, one or more of the blocks/sub-blocks of process 1500 may be executed repeatedly or iteratively. Process 1500 may be implemented by or in the apparatus 1080 as well as any variations thereof. Solely for illustrative purposes and without limiting the scope, process 1500 is described below in the context of apparatus 1000 as the pre-encoding processing unit 1080. Process 1500 may begin at block 1510.

At 1510, process 1500 may involve the processor 1110 of the apparatus 1080 determining a filtering interval of every N frames. The processor 1110 may further determine a GOP size of the video. Process 1500 may proceed from 1510 to 1520.

At 1520, process 1500 may involve the motion compensation module 1130 retrieving a target picture from the target picture buffer 1105. Process 1500 may proceed from 1520 to 1530.

At 1530, process 1500 may involve the processor 1110 determining whether the target picture has a POC value that is a multiple of the GOP size. In an event that the target picture has a POC value that is a multiple of the GOP size, process 1500 may proceed from 1530 to 1540. In an event that the target picture has a POC value that is not a multiple of the GOP size, process 1500 may proceed from 1530 to 1550.

At 1540, process 1500 may involve the apparatus 1080 performing MCTF with N/2 reference pictures, wherein N equals to the filtering interval. In some embodiments, each of the N/2 reference pictures has a POC value smaller than that of the target picture. Process 1500 may proceed from 1540 to 1560.

At 1550, process 1500 may involve the apparatus 1080 performing MCTF with N reference pictures, wherein N equals to the filtering interval. In some embodiments, half of the N reference pictures have POC values smaller than the POC value of the target picture, whereas the other half of the N reference pictures have POC values greater than the POC value of the target picture. Process 1500 may proceed from 1550 to 1560.

At 1560, process 1500 may involve the processor 1110 storing the filtered picture to the filtered picture buffer 1160.

VIII. Illustrative Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 16:
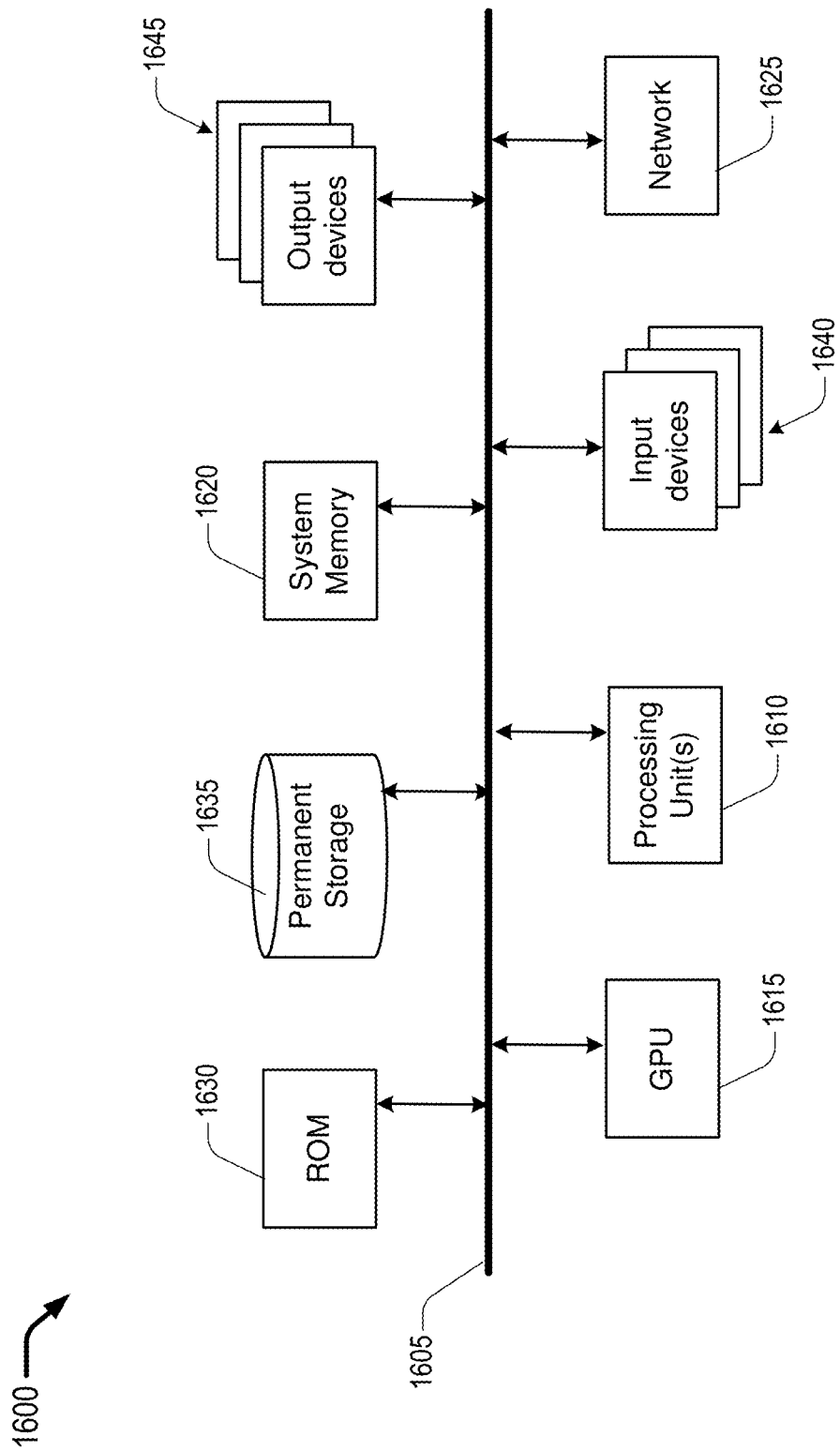
FIG. 16 is a diagram of an example electronic system in accordance with an implementation of the present disclosure.

FIG. 16 conceptually illustrates an electronic system 1600 with which some embodiments of the present disclosure are implemented. The electronic system 1600 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1600 includes a bus 1605, processing unit(s) 1610, a graphics-processing unit (GPU) 1615, a system memory 1620, a network 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the GPU 1615, the read-only memory 1630, the system memory 1620, and the permanent storage device 1635.

From these various memory units, the processing unit(s) 1610 retrieves instructions to execute and data to process in order to execute the processes of the present disclosure. The processing unit(s) may be a single processor or a multi-core processor in different embodiments. Some instructions are passed to and executed by the GPU 1615. The GPU 1615 can offload various computations or complement the image processing provided by the processing unit(s) 1610.

The read-only-memory (ROM) 1630 stores static data and instructions that are used by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the present disclosure use a mass-storage device (such as a magnetic or optical disk and its corresponding disk drive) as the permanent storage device 1635.

Other embodiments use a removable storage device (such as a floppy disk, flash memory device, etc., and its corresponding disk drive) as the permanent storage device. Like the permanent storage device 1635, the system memory 1620 is a read-and-write memory device. However, unlike storage device 1635, the system memory 1620 is a volatile read-and-write memory, such a random access memory. The system memory 1620 stores some of the instructions and data that the processor uses at runtime. In some embodiments, processes in accordance with the present disclosure are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alpha-numeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of processing a video, comprising:
   determining, based on a filtering interval, a plurality of target pictures comprising a first subset of a plurality of source pictures of the video comprising the plurality of source pictures in a temporal sequence, each of the plurality of source pictures having a temporal identifier identifying a temporal location of the respective source picture in the temporal sequence;
   determining, for each of the plurality of target pictures, one or more reference pictures, each of the one or more reference pictures being a source picture of a second subset of the plurality of source pictures, wherein the second subset of the plurality of source pictures comprises the plurality of source pictures that are not in the first subset;
   generating a plurality of filtered pictures each corresponding to a respective one of the plurality of target pictures and generated by performing pixel-based filtering based on the one or more reference pictures corresponding to the respective target picture;
   encoding the video into a bitstream using the plurality of filtered pictures and the second subset of the plurality of source pictures; and
   either:
      performing either a first action or a second action, or one of a first condition, a second condition, a third condition or a fourth condition being applied,
   wherein the first condition comprises:
   at least one target picture of the plurality of target pictures comprises a first subpicture belonging to a first group and a second subpicture belonging to a second group,
   the generating of the corresponding filtered picture for the at least one target picture comprises performing the pixel-based filtering for the first subpicture based on a first number of reference pictures of the one or more reference pictures corresponding to the at least one target picture,
   the generating of the corresponding filtered picture for the at least one target picture further comprises performing the pixel-based filtering for the second subpicture based on a second number of reference pictures of the one or more reference pictures corresponding to the at least one target picture, and the first number is different from the second number, wherein the second condition comprises:

at least one target picture of the plurality of target pictures comprises a first subpicture of natural image (NI) and a second subpicture of screen content image (SCI), and the generating of the corresponding filtered picture for the at least one target picture comprises performing the pixel-based filtering for the first subpicture but not for the second subpicture based on the one or more reference pictures corresponding to the at least one target picture, wherein the third condition comprises:

at least one target picture of the plurality of target pictures comprises a first subpicture of natural image (NI) and a second subpicture of screen content image (SCI), the generating of the corresponding filtered picture for the at least one target picture comprises performing the pixel-based filtering for the first subpicture based on a first number of reference pictures of the one or more reference pictures corresponding to the at least one target picture, the generating of the corresponding filtered picture for the at least one target picture further comprises performing the pixel-based filtering for the second subpicture based on a second number of reference pictures of the one or more reference pictures corresponding to the at least one target picture, and the first number is greater than the second number, wherein the fourth condition comprises the video not including a theme change in the temporal sequence between each of the plurality of target pictures and the one or more reference pictures determined for the respective target picture, wherein the first action comprises determining a group-of-pictures (GOP) size of the video, such that:

the plurality of target pictures comprises a plurality of target pictures of a first kind and a plurality of target pictures of a second kind, each target picture of the first kind having the corresponding temporal identifier being a multiple of the GOP size, each target picture of the second kind having the corresponding temporal identifier not being a multiple of the GOP size, the determining of the one or more reference pictures comprises designating a first number of source pictures from the second subset for each target picture of the first kind, the determining of the one or more reference pictures further comprises designating a second number of source pictures from the second subset for each target picture of the second kind, and the first number is smaller than the second number, and wherein the second action comprises determining a group-of-pictures (GOP) size of the video, such that:

the plurality of target pictures comprises a plurality of target pictures of a first kind and a plurality of target pictures of a second kind, each target picture of the first kind having the corresponding temporal identifier being a multiple of the GOP size, each target picture of the second kind having the corresponding temporal identifier not being a multiple of the GOP size, and for each target picture of the first kind, the corresponding one or more reference pictures comprises only source picture(s) having the temporal location earlier in the temporal sequence than the temporal location of the respective target picture of the first kind.

2. The method of claim 1, wherein the performing of the pixel-based filtering comprises:

dividing the respective target picture into a plurality of prediction blocks;

determining, for each prediction block of the respective target picture, a plurality of motion compensation (MC) results each based on a respective one of the one or more reference pictures corresponding to the respective target picture; and performing, for each pixel of each of the plurality of prediction blocks, bilateral filtering based on the plurality of MC results.

3. The method of claim 2, wherein:

each of the plurality of MC results comprises a best-matching block and a loss value, the best-matching block having same width and height as the respective prediction block, the loss value representing a difference between the best-matching block and the respective prediction block, and the performing of the bilateral filtering comprises calculating, for each pixel of the prediction block, a weighted sum based on corresponding pixel values of the best-matching block and the loss value of each of the plurality of MC results.

4. The method of claim 2, wherein the determining of the plurality of MC results comprises performing an integer pixel search, a fractional pixel search, or both, based on the respective prediction block and the one or more reference pictures.

5. The method of claim 1, wherein:

the plurality of target pictures comprises a first target picture wherein a scene change is introduced immediately preceding the first target picture in the temporal sequence, and the one or more reference pictures corresponding to the first target picture comprises only source picture(s) having the temporal location later in the temporal sequence than the temporal location of the first target picture.

6. An apparatus, comprising:

a processor configured to receive a video comprising a plurality of source pictures in a temporal sequence, each of the plurality of source pictures having a temporal identifier identifying a temporal location of the respective source picture in the temporal sequence;

a target picture buffer configured to store a plurality of target pictures determined by the processor based on a filtering interval, the plurality of target pictures comprising a first subset of the plurality of source pictures;

a reference picture buffer configured to store, for each of the plurality of target pictures, one or more reference pictures determined by the processor, each of the one or more reference pictures being a source picture of a second subset of the plurality of source pictures, wherein the second subset of the plurality of source pictures comprises the plurality of source pictures that are not in the first subset;

a motion compensation (MC) module configured to generate a plurality of filtered pictures each generated by the MC module by performing pixel-based filtering to a respective one of the plurality of target pictures based on the one or more reference pictures corresponding to the respective target picture; and a video encoder configured to encode the plurality of filtered pictures and the second subset of the plurality of source pictures into a bitstream that represents the video, wherein the processor is further configured to either:
  perform either a first action or a second action, or
  apply one of a first condition, a second condition, a third condition or a fourth condition, wherein the first condition comprises:
  at least one target picture of the plurality of target pictures comprises a first subpicture belonging to a first group and a second subpicture belonging to a second group,
  the generating of the corresponding filtered picture for the at least one target picture comprises performing the pixel-based filtering for the first subpicture based on a first number of reference pictures of the one or more reference pictures corresponding to the at least one target picture,
the generating of the corresponding filtered picture for the at least one target picture further comprises performing the pixel-based filtering for the second subpicture based on a second number of reference pictures of the one or more reference pictures corresponding to the at least one target picture, and
the first number is different from the second number,
  wherein the second condition comprises:
at least one target picture of the plurality of target pictures comprises a first subpicture of natural image (NI) and a second subpicture of screen content image (SCI) and
the generating of the corresponding filtered picture for the at least one target picture comprises performing the pixel-based filtering for the first subpicture but not for the second subpicture based on the one or more reference pictures corresponding to the at least one target picture, wherein the third condition comprises:
at least one target picture of the plurality of target pictures comprises a first subpicture of natural image (NI) and a second subpicture of screen content image (SCI),
the generating of the corresponding filtered picture for the at least one target picture comprises performing the pixel-based filtering for the first subpicture based on a first number of reference pictures of the one or more reference pictures corresponding to the at least one target picture,
the generating of the corresponding filtered picture for the at least one target picture further comprises performing the pixel-based filtering for the second subpicture based on a second number of reference pictures of the one or more reference pictures corresponding to the at least one target picture, and
the first number is greater than the second number,
wherein the fourth condition comprises the video not including a theme change in the temporal sequence between each of the plurality of target pictures and the one or more reference pictures determined for the respective target picture,
wherein the first action comprises determining a group-of-pictures (GOP) size of the video, such that:
  the plurality of target pictures comprises a plurality of target pictures of a first kind and a plurality of target pictures of a second kind, each target picture of the first kind having the corresponding temporal identifier being a multiple of the GOP size, each target picture of the second kind having the corresponding temporal identifier not being a multiple of the GOP size,
  the determining of the one or more reference pictures comprises designating a first number of source pictures from the second subset for each target picture of the first kind,
  the determining of the one or more reference pictures further comprises designating a second number of source pictures from the second subset for each target picture of the second kind, and
  the first number is smaller than the second number, and
wherein the second action comprises determining a group-of-pictures (GOP) size of the video, such that:
the plurality of target pictures comprises a plurality of target pictures of a first kind and a plurality of target pictures of a second kind, each target picture of the first kind having the corresponding temporal identifier being a multiple of the GOP size, each target picture of the second kind having the corresponding temporal identifier not being a multiple of the GOP size, and
for each target picture of the first kind, the corresponding one or more reference pictures comprises only source picture(s) having the temporal location earlier in the temporal sequence than the temporal location of the respective target picture of the first kind.

\* \* \* \* \*